United States Patent
Jeffries

(10) Patent No.: US 10,623,801 B2
(45) Date of Patent: Apr. 14, 2020

(54) MULTIPLE INDEPENDENT VIDEO RECORDING INTEGRATION

(71) Applicant: James R. Jeffries, Salt Lake City, UT (US)

(72) Inventor: James R. Jeffries, Salt Lake City, UT (US)

(73) Assignee: James R. Jeffries, Salt Lake City, UT (US)

( * ) Notice: Subject to any disclaimer, the term of this patent is extended or adjusted under 35 U.S.C. 154(b) by 14 days.

(21) Appl. No.: 15/384,277

(22) Filed: Dec. 19, 2016

(65) Prior Publication Data

US 2017/0180780 A1 Jun. 22, 2017

Related U.S. Application Data

(60) Provisional application No. 62/268,919, filed on Dec. 17, 2015.

(51) Int. Cl.
*H04N 21/43* (2011.01)
*H04N 21/472* (2011.01)
*H04N 21/462* (2011.01)
*H04N 21/482* (2011.01)

(52) U.S. Cl.
CPC ..... *H04N 21/4307* (2013.01); *H04N 21/4622* (2013.01); *H04N 21/47217* (2013.01); *H04N 21/4828* (2013.01)

(58) Field of Classification Search
CPC ............. H04N 21/4307; H04N 21/235; H04N 21/242; H04N 21/431; H04N 21/435; H04N 21/47217; H04N 21/4825; H04N 21/8455; H04N 21/8456
USPC ........................................................ 725/116
See application file for complete search history.

(56) References Cited

U.S. PATENT DOCUMENTS

| | | |
|---|---|---|
| 7,921,114 B2 | 4/2011 | Figueroa et al. |
| 8,205,148 B1 | 6/2012 | Sharpe et al. |
| 8,464,154 B2 | 6/2013 | Herberger et al. |
| 8,558,953 B2 | 10/2013 | Black |
| 8,621,355 B2 | 12/2013 | Eppolito et al. |
| 8,645,485 B1 | 2/2014 | Yadid et al. |

(Continued)

FOREIGN PATENT DOCUMENTS

| | | |
|---|---|---|
| WO | 2008/151416 A1 | 12/2008 |
| WO | 2009/114134 A2 | 9/2009 |

(Continued)

*Primary Examiner* — Alfonso Castro
(74) *Attorney, Agent, or Firm* — Kunzler Bean & Adamson

(57) ABSTRACT

For integrating multiple independent video recordings, method is disclosed. The method includes a receiving a plurality of videos from a plurality of sources. The method also includes receiving metadata for the plurality of videos, the metadata comprising a reference time for each of the plurality of videos. The method includes selecting for playback a first video and a second video, wherein the first video and the second video were recorded on different devices not directly networked together. The method further includes synchronizing playback of the first video and the second video in a single user interface, wherein synchronizing playback of the first video and the second video comprises integrating the first video and the second video into a common timeline based at least in part on the metadata of each of the first video and the second video.

19 Claims, 22 Drawing Sheets

(56) References Cited

U.S. PATENT DOCUMENTS

| | | | |
|---|---|---|---|
| 9,009,596 B2 | 4/2015 | Ortiz | |
| 9,086,838 B2 | 7/2015 | Panvelwala | |
| 9,418,703 B2* | 8/2016 | Abbate | H04N 9/8205 |
| 9,432,720 B2 | 8/2016 | Kruglick | |
| 2006/0120624 A1* | 6/2006 | Jojic | G06F 17/30843 |
| | | | 382/284 |
| 2008/0307311 A1 | 12/2008 | Eyal | |
| 2009/0087161 A1 | 4/2009 | Roberts et al. | |
| 2010/0183280 A1 | 7/2010 | Beauregard et al. | |
| 2011/0018998 A1 | 1/2011 | Guzik | |
| 2012/0224826 A1 | 9/2012 | Caudle et al. | |
| 2012/0263439 A1* | 10/2012 | Lassman | H04N 5/76 |
| | | | 386/280 |
| 2013/0039632 A1 | 2/2013 | Feinson | |
| 2013/0063489 A1 | 3/2013 | Hourie et al. | |
| 2013/0132839 A1* | 5/2013 | Berry | G11B 27/031 |
| | | | 715/719 |
| 2013/0300933 A1 | 11/2013 | Thorson | |
| 2014/0053214 A1* | 2/2014 | Walker | H04N 21/2343 |
| | | | 725/62 |
| 2015/0123973 A1 | 5/2015 | Larsen | |
| 2015/0228306 A1* | 8/2015 | Roberts | G11B 27/031 |
| | | | 386/285 |
| 2016/0192009 A1* | 6/2016 | Sugio | H04N 21/4756 |
| | | | 725/32 |
| 2016/0360262 A1* | 12/2016 | Matejka | H04N 21/4331 |

FOREIGN PATENT DOCUMENTS

| | | |
|---|---|---|
| WO | 2012/098427 A1 | 7/2012 |
| WO | 2013/093176 A1 | 6/2013 |

* cited by examiner

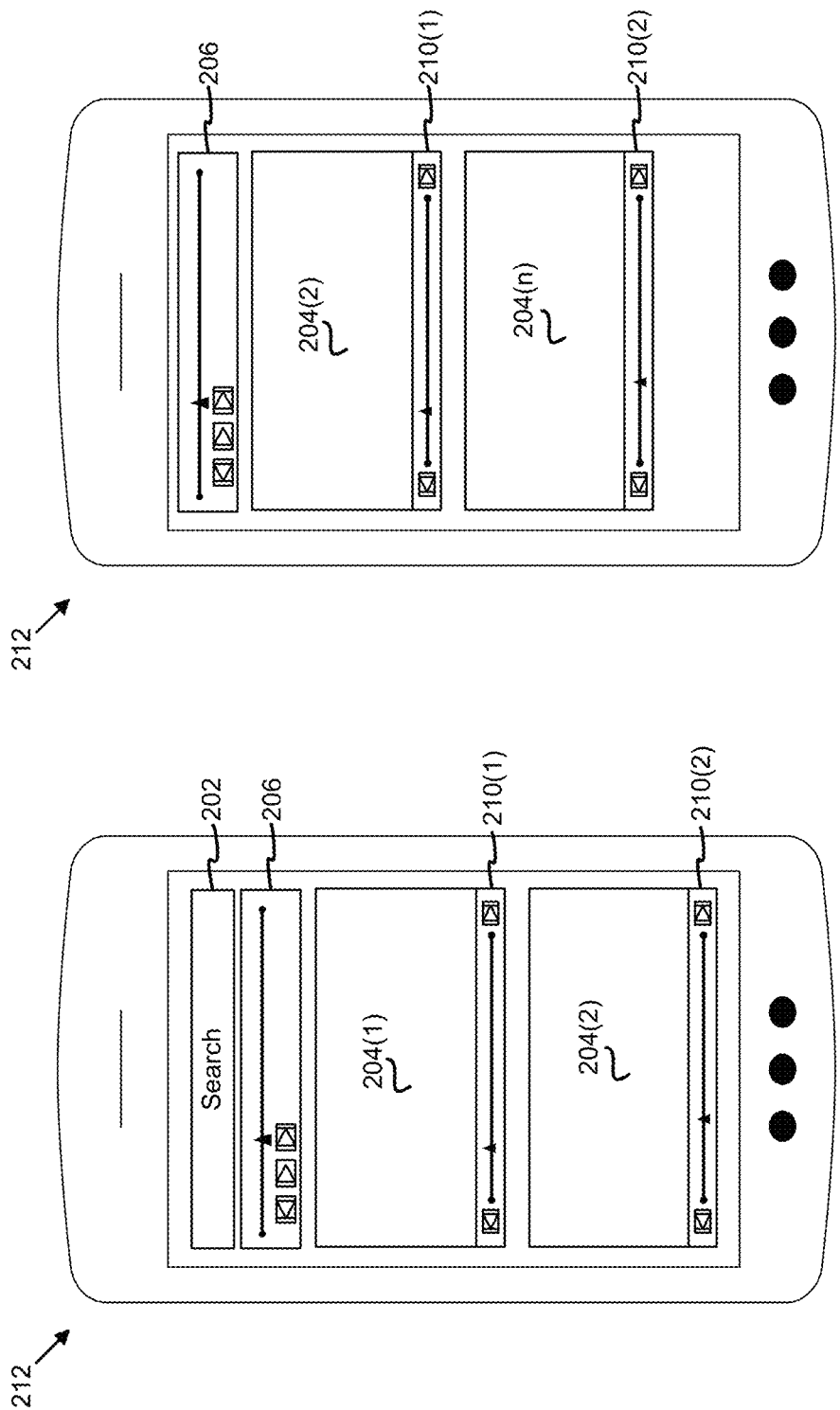

| Thumbnail | Public? | Number of linked videos | Description | Location | Reference time | Duration | User | Search tags | Delete |
|---|---|---|---|---|---|---|---|---|---|
| △○□ | Yes | 2 | Political rally | 33.9889, -118.203 | 11/29/16 13:45:00 | 00:20:11 | alice12 | democrat, republican, politics | X |
| △○□ | Yes | 1 | Sports game | 29.4765, -120.203 | 10/13/16 17:50:14 | 00:01:45 | bob23 | basketball, Lakers | X |
| △○□ | No | 2 | Air show | 19.8265, -109.5712 | 10/16/16 10:21:12 | 00:5:35 | bob23 | airplanes | X |
| △○□ | Yes | 1 | Sports game | 29.4765, -120.203 | 10/13/16 17:50:35 | 00:02:28 | chris7 | basketball | X |

FIG. 10

MULTIPLE INDEPENDENT VIDEO RECORDING INTEGRATION

CROSS-REFERENCE TO RELATED APPLICATIONS

This application claims priority to U.S. Provisional Patent Application No. 62/268,919 entitled "MULTIPLE INDEPENDENT VIDEO RECORDING INTEGRATION" and filed on 17 Dec. 2015 for James. R. Jeffries, which is incorporated herein by reference. See MPEP § 211.

FIELD

This invention relates to recorded videos, integrated media players, and more particularly to multiple independent video recording integration.

BACKGROUND

Many different types of devices are capable of recording video. Users of these devices may record the same event or different events simultaneously, but they may film from different locations or viewpoints. Watching the multiple recorded videos in sync with one another may be difficult.

BRIEF SUMMARY

Methods for populating an electronic message with personal boilerplate are disclosed. Also disclosed are systems, apparatus, and computer program products for implementing the methods.

A method for integrating multiple independent video recordings includes receiving a plurality of videos from a plurality of sources. The method also includes receiving metadata for the plurality of videos, the metadata comprising a reference time for each of the plurality of videos. The method includes selecting for playback a first video and a second video, wherein the first video and the second video were recorded on different devices not directly networked together. The method further includes synchronizing playback of the first video and the second video in a single user interface, wherein synchronizing playback of the first video and the second video comprises integrating the first video and the second video into a common timeline based at least in part on the metadata of each of the first video and the second video.

In some embodiments, synchronizing playback of the first video and the second video further comprises presenting the first video and the second video in adjacent locations within the user interface. In one embodiment, the first video is positioned for viewing by a user's left side and the second video is positioned for viewing by the user's right side. In certain embodiments, the method may also include dynamically adding a third video that overlaps in time with one of the first video and the second video. The method may also include removing the second video from the user interface in response to the second video not overlapping in time with the first video. In certain embodiments, synchronizing playback of the first video and the second video further comprises presenting audio from the first video while muting audio from the second video.

In certain embodiments, synchronizing playback of the first video and the second video further comprises presenting the common timeline as a slider element in the user interface, wherein a user selects a playback position of the first video and the second video using the slider element. In one embodiment, the slider element visually indicates moments on the common timeline where the first video and the second video overlap in time and moments where the first video and the second video do not overlap in time.

In certain embodiments, selecting for playback a first video and a second video includes presenting at least a subset of the plurality of videos to a user, the subset including the first video and the second video and receiving user selection of the first video and the second video. In such embodiments, presenting at least a subset of the plurality of videos to a user occurs in response to the user providing a video search query. Here, the subset of the plurality of videos being search results corresponds to the video search query. In one embodiment, each video in the subset has metadata matching a parameter of the video search query. The parameter may be one or more of an event, a time range, a geo-location, and a producer.

In some embodiments, the user interface is provided via a social networking platform. Here, synchronizing playback of the first video and the second video in a single user interface may include presenting the first video and the second video over a user interface of the social networking platform. In such embodiments, the method may also include filtering the search results to only contain videos from users of the social networking platform. In one embodiment, filtering the search results includes only returning videos from social network connections of the user that provides the video search query.

In certain embodiments, presenting at least a subset of the plurality of videos to a user occurs in response to the user providing a video search query comprises presenting a map, the map showing locations corresponding to creation locations of the search results. In one embodiment, the user selection includes a third video, wherein synchronizing playback of the first video and the second video further comprises dynamically adding the third video to the playback of the first and second videos in response to content of the third video overlapping in time content of the first or second videos.

In some embodiments, the method includes converting each of the plurality of videos into a common format. In further embodiments, the method includes storing the converted videos on a storage device.

In certain embodiments, synchronizing playback of the first video and the second video further comprises compiling the first video and the second video into a single video using the common timeline. In some embodiments, synchronizing playback of the first video and the second video further comprises embedding playback of the first video and the second video into a third video. In one embodiment, the metadata further comprises timing metadata, wherein synchronizing playback of the first video and the second video comprises aligning the first video and the second video based at least in part on the one or more timing metadata. In one embodiment, the metadata comprises user-defined metadata.

In some embodiments, synchronizing playback of the first video and the second video may also include receiving selection of an audio event in the first video and identifying a corresponding audio event in the second video. In such embodiments, synchronizing playback of the first video and the second video further includes integrating the first video and the second video into a common timeline based on the audio events.

In certain embodiments, synchronizing playback of the first video and the second video includes receiving selection of a visual event in the first video and identifying a corresponding visual event in the second video. In such embodiments, synchronizing playback of the first video and the second video further includes integrating the first video and the second video into a common timeline based on the visual events. In one embodiment, synchronizing playback of the first video and the second video further includes adjusting the playback of only the second video to synchronize with the first video.

In some embodiments, at least one of the first video and the second video is a live recording streamed from a recording device. In certain embodiments, the method may also include storing the live recording to a storage device.

An apparatus for integrating multiple independent video recordings includes a network interface and a controller that receives, via the network interface, both a plurality of videos from a plurality of recording devices and metadata for the plurality of videos, the metadata comprising a reference time for each of the plurality of videos. The controller also selects for playback a first video and a second video, wherein the first video and the second video were recorded on different recording devices not directly networked together. The controller further synchronizes playback of the first video and the second video in a single user interface, wherein synchronizing playback the plurality of recorded video and audio comprises integrating the first video and the second video into a common timeline based at least in part on the metadata of each of the first video and the second video.

In some embodiments, the apparatus includes a storage device that stores the received plurality of videos. In such embodiments, at least one of the first video and the second video is a live recording streamed from a recording device. In certain embodiments, the apparatus also includes a video converter that converts each of the plurality of videos into a common format, wherein the storage device stores the plurality of videos in the common format.

In certain embodiments, the controller receives a video search query from a user. In such embodiment, selecting for playback a first video and a second video may include presenting at least a subset of the plurality of videos to a user, each video in the having metadata matching a parameter of the video search query. Here, the parameter may be one or more of an event, a time range, a geo-location, and a producer the subset of the plurality of videos. The controller further receives user selection of the first video and the second video, the first video and the second video being a part of the subset.

A program product for integrating multiple independent video recordings includes executable code to perform: receiving a plurality of videos from a plurality of independent sources, receiving metadata for the plurality of videos, the metadata comprising a creation time for each of the plurality of videos, selecting for playback a first video and a second video, wherein the first video and the second video were recorded on different devices not directly networked together, and synchronizing playback of the first video and the second video in a single user interface. Here, synchronizing playback the plurality of recorded video and audio includes integrating the first video and the second video into a common timeline based at least in part on the metadata of each of the first video and the second video. The program product may be embedded in a computer readable medium that stores the executable code.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which:

FIG. 2B is a diagram illustrating another embodiment of a user interface for a mobile device for multiple independent video recording integration;

FIG. 2C is a diagram illustrating a further embodiment of the user interface of FIG. 2B;

FIG. 10 is a diagram illustrating one embodiment of a content table for multiple independent video recording integration;

DETAILED DESCRIPTION

Figure 1:
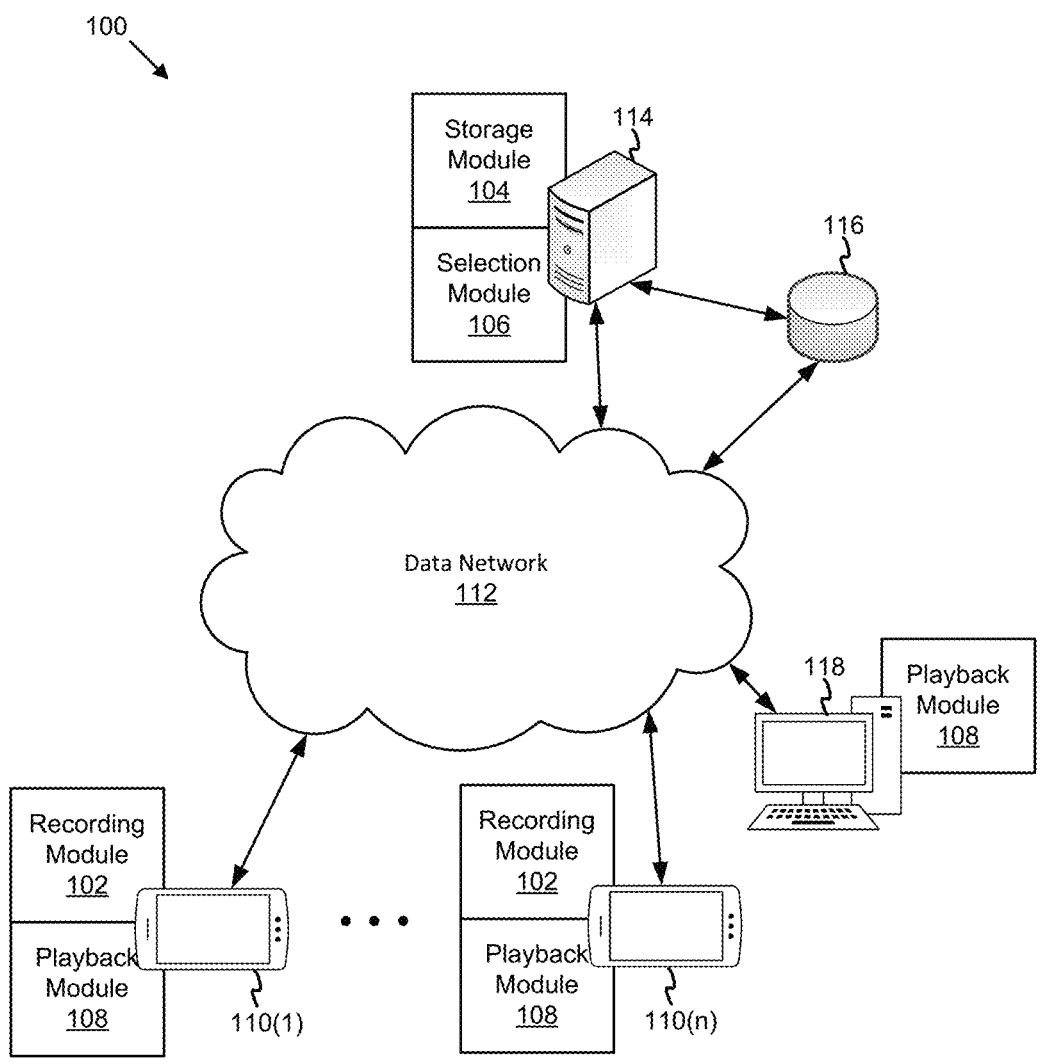
FIG. 1 is a schematic block diagram illustrating one embodiment of a system for multiple independent video recording integration.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a cellular network, a wireless network such as a Wi-Fi network, or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus, or other devices to produce a computer implemented process such that the program code which executed on the computer or other programmable apparatus provide processes for implementing the functions/acts specified in the flowchart and/or block diagram block or blocks.

The flowchart diagrams and/or block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The disclosure relates to integrating video recording from multiple independent sources. The video recordings may be recorded by multiple different users. The users and the videos may not be associated with each other, may not be connected with each other, or the like. Some of those videos may include overlapping recording times. The videos may be synchronized such that the contents of the video depict content that occurred substantially simultaneously. The synchronization of the videos may be based, at least in part, on metadata associated with the videos. The videos may be uploaded to a storage and selection platform.

Users may interact with the storage and selection platform. Users may upload videos, search for videos, and play videos. The storage and selection platform may receive videos, process user searches, return videos as search results, and may synchronize videos. The storage and selection platform may synchronize videos in response to selecting search results.

FIG. 1 depicts one embodiment of a system 100 for integrating video recording from multiple independent sources. The system 100 may include a recording module 102, storage module 104, selection module 106, and playback module 108. The system 100 may include at least two recording devices 110(1)-(n) (collectively referred to as recording devices 110). The system 100 may include a data network 112. The system 100 may include a server 114 and/or database 116. The system 100 may include a client device 118.

In one embodiment, the recording module 102 may be configured to record video. In one embodiment, the recorded video includes both a visual track and an audio track. The video track may include one or more channels of visual data, each channel having a plurality of frames representing a sequence on images. When played back, the sequence of images represents a moving visual image. Similarly, the audio track may include one or more audio channels, each audio channel storing an audio signal representing sounds. The video track and the audio track may be synchronized so that sounds corresponding to the moving visual image are played at the same time the moving visual image is displayed.

The recording module 102 may be implemented on a recording device 110(1)-(n). In one embodiment, a recording device 110 may include a phone, such as a cell phone, smart phone, or the like. In one embodiment, a recording device 110 may include a tablet computer, laptop computer, desktop computer, or the like. In one embodiment, a recording device 110 may include a smart watch or other wearable computing device. In one embodiment, the recording device 110 may include a video camera such as a drone camera, a personal video camera, an action camera such as a GOPRO camera, a body camera, web camera, or the like. In one embodiment, the recording device 110 may include a camera such as a still camera that can record video and/or audio. In one embodiment, the recording device 110 may include a video recording device with a multi-camera integrated therein, such as a 360-degree view camera. In one embodiment, the recording device 110 may include a virtual reality headset such as virtual reality googles. In one embodiment, the recording device 110 may include the recording module 102. In one embodiment, the recording device 110 may include software that implements the recording module 102, such as an app, widget, or the like.

In one embodiment, the recording module 102 records video and/or audio signals received from the recording device 110(1)-(n). The recording module 102 may record the video of any video file format. For example, in certain embodiments, the recorded video may include a WebM, Flash Video, GIF, AVI, MP4 file, a proprietary video format file, or any other video file format. The recorded audio may include audio of any audio file format. For example, in certain embodiments, the recorded audio may include a MP3, OGG, WAV, WebM file, a proprietary audio format file, or any other audio file format. In one embodiment, the video file may include audio embedded therein.

In one embodiment, the recording module 102 or another module may convert the recorded video and/or audio to a file format compatible with the playback module 108, one or more recording devices 110(1)-(n), a server 114, a database 116, a certain client device 118, or the like. For example, the recording module 102 and/or the recording device 110 may include a video converter for converting the recorded video and/or audio into a format used by the storage module 104, server 114, and/or database 116.

In certain embodiments, the recording module 102 automatically generates metadata in response to recording video and/or audio. The metadata includes a reference time for the recording. The reference time correlates a moment or event in the video (e.g., a frame) with an objective moment in time. For example, the reference time may indicate that a particular frame of the video corresponds to a specific time (e.g., 7:23:49 AM, Central Time Zone) on a specific date (e.g., Jan. 1, 2016). The reference time facilitates integration of multiple videos obtained from independent sources. In some embodiments, the reference time may be a start time of the recording, an end time of the recording. In other embodiments, the reference time corresponds to a specific frame of the recorded video.

In some embodiments, the generated metadata include a geo-location of recording (e.g., GPS coordinates), a direction of recording (e.g., the direction the camera faces while recording), and/or an altitude of recording. In one embodiment, the metadata may include timing metadata such as a start time and end time of recording, a start time and a recording duration time, a time the video was stored, a time the video was transmitted, or the like. The timing metadata may be automatically generated by the recording module 102, may be generated by another module or application on the recording device 110, or may be manually entered. In certain embodiments, the metadata may further include a username, recorder and/or producer information (such as a name or username of the video generator), text description of the video, a category or genre of the video, a tag for the video (such as a 'hashtag' label used to identify a specific topic or other metadata tag), camera information including a camera device type (e.g., mobile phone, wearable camera, etc.) and camera settings used to capture the video, and the like. While some metadata is used to synchronize playback of videos overlapping in time, other metadata may be used to search for and locate uploaded videos, as described in further detail below.

In one embodiment, the recording module 102 may upload the recorded video, audio, and/or metadata files to a server 114. Thus, the server 114 receives both the recorded video (e.g., including audio) and metadata for the recorded video. The server 114 receives a plurality of videos from a plurality of sources, for example from the recording devices 110(1)-(n), and further receives metadata for the received videos. Additional items of metadata may be added to or associated with video files upon uploading the video files to the server 114, such as a social networking account of the video owner, creator, and/or uploader, social connections of the video owner, creator, video privacy settings including an indication whether the video is public or private (e.g., accessible to only select users), and/or an indication whether the video is part of a software-as-a-service application or account. In certain embodiments, the metadata may be embedded within the video files. In other embodiments, the metadata may be in a separate file. In certain embodiments, the metadata may be entered after the video files are uploaded to the server 114.

The server 114 is one embodiment of an apparatus for integrating multiple independent video recordings, according to the present disclosure. In one embodiment, the server 114 may include a desktop computer, a cloud server, a main frame computer, or any other type of server. In certain embodiments, the server 114 may include at least a portion of one or more modules of the system 100. In one embodiment, the recording module 102, the playback modules 108, one or more recording devices 110(1)-(n) and/or a client device 118 are communicatively coupled to the server 114 through a data network 112.

In one embodiment, the data network 112 may include a digital communication network that transmits digital communications related to system 100. The data network 112 may include a wireless network, such as a wireless cellular network, a local wireless network, such as a Wi-Fi network, a Bluetooth® network, or the like. The data network 112 may include a wide area network ("WAN"), a storage area network ("SAN"), a local area network ("LAN"), an optical fiber network, the internet, or other digital communication network.

The data network 112 may include two or more networks. The data network 112 may include one or more servers, routers, switches, and/or other networking equipment. The data network 112 may also include computer readable storage media, such as a hard disk drive, an optical drive, non-volatile memory, random access memory ("RAM"), or the like.

In one embodiment, another module in the recording devices 110, such as an upload module (not shown) may upload the recorded video and/or metadata files to the server 114. In certain embodiments, video and/or metadata files may be uploaded to the server 114 by a device other than the recording device 110 that includes the recording module 102. For example, should the recording device 110 not be connected (or connectable) to the data network 112, another device having an upload module (for example, the client device 118) then uploads the video and/or metadata files to the server 114. In one embodiment, the recording module 102 or another module may upload the video and/or metadata files to the server 114 while the recording module 102 records the video and/or audio. In this manner, the recording module 102 may stream a live recording of video (e.g., upload video and/or metadata content to the server 114 in real time or near real time).

In one embodiment, the recording module 102 or another module may upload a video file to the server 114 that does include metadata. Here, a user may input the metadata via the recording module 102 or other module. For example, a user may input a reference time, a start time and/or end time of a video, the direction of recording of the video, the altitude of recording the video, or any other metadata including metadata mentioned above after uploading the video to the server 114. In response to the user inputting the metadata, the server 114 may associate or integrate the inputted metadata with the received video. In this manner, the recording module 102 or other module may upload videos that were not recorded by the recording module 102. The user may input the metadata before, during, or after the recording module 102 or other module transmits the video and/or metadata files to the server 114.

In one embodiment, the system 100 may include a storage module 104. The storage module 104 may be configured to store the recorded video and metadata files of the recorded video and audio. The storage module 104 may be implemented on the server 114 or another device accessible via the data network 112. In one embodiment, the metadata may include any of the metadata discussed above, such as reference time, time and date of recording, geo-location, or the like. In one embodiment, the server 114 may include at least a portion of the storage module 104. In one embodiment, the storage module 104 may store the recorded video and metadata on the server 114. In one embodiment, the storage module 104 may store the recorded video and metadata in a data storage accessible via the data network 112, such as the database 116.

The database 116 may include any type of database capable of storing video and/or metadata files. For example, the database may be a SQL database, object-relational database, NoSQL database, or the like. In one embodiment, the database 116 may store the uploaded video and/or metadata files belonging to the uploaded video. In one embodiment, the database 116 may store references to the video and/or metadata files and the video and/or metadata files may be stored elsewhere, such as at the server 114, at a storage array, or the like.

In one embodiment, the server 114 may include the database 116, such that the database may execute and/or be stored on the server 114. In one embodiment, the database 116 may execute and/or be stored on device other than the server 114. The server 114 and the database may communicate via the data network 112 or via a direct link, as depicted in FIG. 1.

In one embodiment, a recording device 110(1)-(n) may upload recorded video (and audio) and metadata of the recorded video (and audio) to the server 114. The storage module 104 may process the recorded video and metadata and store the recorded video and metadata. In one embodiment, the storage module 104 processing the incoming (e.g., received) video may include adding metadata to or associating metadata with the recorded video and/or audio files.

In certain embodiments, processing the recorded video and metadata may include converting one or more files of recorded video and/or metadata into a different file format. For example, the server 114 may be configured to convert all incoming video into a common format. In one embodiment, the server 114 and/or the storage module 104 contains a video converter that converts each of the plurality of videos into the common format. Thereafter, the storage module 104 may store the converted video in a storage device located in the server 114, with the database 116, or at another location accessible via the data network 112.

In one embodiment, the storage module 104 may store videos being uploaded in real time. For example, a live recording being streamed to the server 114 may be transmitted to a playback module 108 while simultaneously being stored at a storage device for playback at a later time. The storage module 104 may store the entire video after the uploading in real time has ceased.

In one embodiment, the system 100 may include a selection module 106. The selection module 106 may be configured to select one or more videos. The one or more selected videos may include videos that do not depict the same event or content. The one or more selected video may include video and audio content unrelated to each other. The selection module 106 may execute on the server 114.

In one embodiment, a plurality of videos received by the server 114 were recorded on different recording devices 110(1)-(n) not directly networked together. As used herein, "not directly networked together" in one embodiment may include the recording devices 110(1)-(n) not being physically connected, for example via a cable. In one embodiment, "not directly networked together" may include the recording devices 110(1)-(n) not being connected via a LAN, WAN, wireless network such as a Wi-Fi network, a cellular network, or the like. The recording device 110(1)-(n) may not be in direct communication with one another.

In one embodiment, the selection module 106 may select from video stored by the storage module 104, on the server 114, in the database 116, or the like. In another embodiment, the selection module 106 may select video stored on third-party server and the server 114 and/or third-party database 116 may include metadata associated with that video stored on the third-party server. In this manner, the selection module 106 may select one or more videos not stored on the server 114 or in the database 116.

The selection module 106 selects for playback at least a first video and a second video, the first and second video being recorded on separate devices not directly networked together (e.g., recorded on independent devices). The selection module 106 may select the video in a variety of ways. In one embodiment, the selection module 106 may receive a search query. In response, the selection module 106 may parse and/or process the search query to identify videos relevant to the search query (e.g., search results), where the identified videos include the first video and second video.

For example, a client device 118 may send a search query via the data network 112, the search query including one or more parameters. Examples of parameters included in the search query include, but are not limited to, an event, a keyword, a title, a description, a geo-location, a time and/or date, and a producer. The parameters of the search query may correspond to metadata belonging to the video files. As discussed above, the metadata embedded in (or otherwise associated with) an uploaded video file may be used to locate the video. Such metadata may include, but is not limited to, a reference time, a geo-location, a video description, a name (e.g., username) of the video creator, a label (e.g., hashtag) or other metadata tag associated with the video, social networking connections of the creator, video privacy settings (e.g., used to determine whether the video is to be included in search results for a particular user), a recording device type (e.g., cell phone, GOPRO or similar action camera, body cam, 360 degree camera, VR device, etc), and whether part of SaaS or not.

In some embodiments, the search query may include one or more search terms specifying a title or description of a video. Here, the selection module 106 selects certain videos based, at least in part, on the metadata of those videos, including title data or description data that is the same as or similar to the title or description specified in the search query. The one or more search terms may include a keyword linked to a location or event. In one embodiment, the one or more search terms may include a hashtag label or other metadata tag. Here, the selection module 106 searches for videos having the label or metadata tag specified in the search query.

In certain embodiments, the search query may include one or more search terms specifying a geo-location. Here, the selection module 106 selects certain videos based, at least in part, on the metadata of those videos including recording geo-location data near a geo-location specified in the search query. The geo-location may be a set of coordinates, a street address, a city name, a zip or postal code, a place name, or the like.

In one embodiment, the search query may include geo-location data associated with the geo-location of the client device 118 submitting the search query. For example, the client device may automatically include its geo-location data with the search query. In this manner, the selection module 106 may select one or more videos that were recorded near the location of the client device 118. In one embodiment, the search query may include the geo-location data associated with the geo-location of the client device 118 without a user manually inputting the geo-location data.

In some embodiments, the search query may include one or more search terms specifying a date or a range of dates. The selection module 106 may select certain videos based, at least in part, on the recording date metadata of those videos close to the date data specified in the search query or the recording date metadata being within a range of dates specified in the search query. In one embodiment, the search query may include one or more search terms specifying a time. The selection module 106 may select certain videos based, at least in part, on the metadata of those videos including time metadata (such as a reference time, a recording time, a start and/or end time, etc.) within a predefined range of the one or more times specified in the search query.

In certain embodiments, the search query may include one or more search terms specifying content of another piece of metadata. The selection module 106 may select certain videos based, at least in part, on the metadata of those videos including metadata similar to the piece of metadata specified in the search query. In one embodiment, the selection module 106 may select video content that is being uploaded to the server 114 in real time.

In some embodiments, a video may include metadata indicating that the video is accessible to certain users. For example, the video may only be accessible to social network connections of the creator, to users of the platform hosting the video, to users within certain geographic regions, to subscribers, to paid subscription members, and the like. In one embodiment, in response to the search query not indicating that the user generating the search query is permitted to access a video as indicated by the video's metadata (or indicating that the user is not permitted to access the video), the selection module 106 may not select the video.

In some embodiments, the selection module 106 selects video in response to user input choosing certain video from the search results. For example, the selection module 114 may present search results to the user generating the search query (e.g., including title/description, thumbnail, reference time, and/or other metadata) and the user selects at least a first video and second video from the presented search results.

In certain embodiments, in response to the selection module 106 selecting one or more videos, the selection module 106 may send the selected videos to a client device 118 for playback. In one embodiment, sending the selected videos to a client device 118 may include sending one or more video files, audio files, and/or metadata files. In one embodiment, sending a selected video to a client device 118 may include sending a hyperlink or other reference of one or more video files, audio files, and/or metadata files. The selection module 106 may send the selected videos to a client device 118 via the data network 112.

In one embodiment, the client device 118 may include a phone, such as a cell phone, smart phone, or the like. In one embodiment, the client device 118 may include a tablet computer, laptop computer, desktop computer, or the like. In one embodiment, the client device 118 may include a smart watch or other wearable computing device. In one embodiment, the client device 118 may include a virtual reality headset. In one embodiment, the client device 118 may include the playback module 108. In one embodiment, the client device 118 may play one or more videos in a single user interface, for example using the playback module 108, an Internet browser, or any other software capable of playing the selected videos, or any other combination of software.

In one embodiment, the client device 118 may include virtual reality room. A virtual reality room may include a room with one or more walls and the walls may include one or more screens for playing videos. The virtual reality room may include one or more speakers for playing audio. The playback module 108 may display one or more videos in the virtual reality room. The videos may include videos recorded by recording module 102 of the recording devices 110(1)-(n) and retrieved from the server 114 and/or database 116 as described above. In one embodiment, the playing 108 module may play one or more videos on each wall, ceiling, and/or floor of the virtual reality room. The playback module 108 may synchronize the different videos. The virtual reality room may include any number of walls and may be any shape or size. In one embodiment, the virtual reality room may be circular or curved and the playback module 108 may play different videos on different sections of the curved wall or walls.

In one embodiment, the system 100 may include a playback module 108. The playback module 108 may be configured to play one or more recorded video and audio. The playback module 108 may execute on the one or more recording devices 110(1)-(n) and/or the client device 118. In some embodiments, the playback module 108 may execute on a device that includes the recording module 102, such as recording device 110(1)-(n). In some embodiments, the playback module 108 may execute on a device that does not include the recording module 102, such as the client device 118. In one embodiment, a program, software, hardware, or the like may include both the recording module 102 and the playback module 108. Furthermore, in some embodiments, one or more recording devices 110(1)-(n) may not include the playback module 108, for example, where a recording device 110(1)-(n) may include a personal camera without playback capabilities.

In certain embodiments, a server-side portion of the playback module 108 resides on the server 114 and a client-side portion on the recording device 110 or client device 118. For example, the server-side portion of the playback module 108 may synchronize and transmit at least a first and second video and the client-side portion received the videos and controls output devices at the recording device 110 or client device 118 to present the first and second video in synchronization.

Additionally, the playback module 108 may be configured to synchronize playback of the first video and second video in a single user interface. For example, the single user interface may be a single web browser window, frame, or tab. As another example, the single user interface may be a single application (e.g., mobile application). In yet another example, the single user interface may be an integrated media player that presents the first and second videos at the same time.

In synchronizing the playback of the first and second videos, the playback module 108 may present the first and second videos in adjacent locations of the user interface. For example, the first and second videos may be displayed one atop another. As another example, the first and second videos may be arranged side-by-side, in horizontal fashion. In certain embodiments, the playback module 108 simulates a 3D video image by arranging first video and second video side-by-side so that one video is positioned for viewing by the user's left side and the other video is positioned for viewing by the user's right side. A divider may be placed between the first and second videos so that each side only sees one video (e.g., each eye sees only one video).

In one embodiment, playing one or more recorded video and audio may include synchronizing the one or more recorded video and audio (referred to as synchronizing playback) based, at least in part, on the metadata of each of the recorded video and audio. Here, synchronizing playback of the first video and the second video may include integrating the first video and the second video into a common timeline based at least in part on the metadata of each of the first video and the second video. In one embodiment, synchronizing playback of the first video and the second video further comprises presenting audio from the first video while muting audio from the second video.

In this manner, the client device 118 may play multiple videos that were recorded simultaneously (or substantially simultaneously) by the different recording devices 110(1)-

(*n*) and the recorded videos were not connected, previously associated, or the like on the server 114 and/or the database 116. In one embodiment, the playback module 108 may be configured to play one or more video and/or audio files that are being uploaded to the server 114 in real time. In this manner, the playback module 108 may stream in real time one or more videos in addition to or in place of recorded videos.

In one embodiment, the playback module 108 may synchronize multiple videos received from the selection module 106. The playback module 108 may synchronize the videos based, at least in part, on the metadata of the recorded videos, the metadata including the reference time described above. In one embodiment, the metadata of the recorded videos may include the time, date, location, and direction the videos were recorded. The playback module 108 may play the videos such that each video plays the portion of the video corresponding to a certain playback time.

For example, in one embodiment, the playback module 108 may play a first video and a second video. The metadata of the first video may include a reference time indicating that the first video was recorded on Jan. 1, 2015 from 8:00:00 AM to 8:10:00 AM and the metadata of the second video may indicate that the second video was recorded on Jan. 1, 2015 from 8:07:00 AM to 8:12:00 AM. The playback module 108 may synchronize the videos based on the reference time, thereby integrating the first video and the second video into a common timeline. The playback module 108 may play the first video and the second video such that each video simultaneously depicts the portion of the video corresponding to a current playback time on the common timeline, for example, 8:08:10 AM.

Note that the timeline may refer to a universal time (e.g., coordinated universal time "UTC") or may refer to the equivalent time in a local time zone. For example, multiple recordings of a celestial event (e.g., a solar or lunar eclipse) may be recorded in various geographical locations, with the videos' reference time allowing for selection of multiple videos of the same celestial event. Here, the reference time is not regionally bound, but may refer either to UTC or be converted to a common time zone. In the above example, the first video may be recorded from 8:00:00 AM to 8:10:00 AM Mountain Time Zone with the second video being recorded from 7:07:00 AM to 7:12:00 AM Pacific Time Zone, which refers to the same universal time as 8:07:00 AM to 8:12:00 AM Mountain Time Zone.

In some embodiments, at least one of the selected videos may include a different start and/or end times than others of the selected videos. In one embodiment, the playback module 108 does not play one or more videos if one or more videos do not contain a portion corresponding to a certain time on the common timeline. In a further embodiment, in response to the playback module 108 playing a portion of a video corresponding to a certain time where one or more other videos contain a portion corresponding to that time, the playback module 108 may play those one or more other videos, thus presenting multiple videos simultaneously.

Continuing the above example, while the first video plays one or more portions corresponding to 8:00:00 AM through 8:06:59 AM, the second video may not play as it has no content for that part of the common timeline. In response to the first video playing a portion corresponding to 8:07:00 AM to 8:10:00 AM, the playback module 108 may play the second video in addition to the first video. In one embodiment, the playback module 108 may dynamically add the second video into the single user interface at a location adjacent to the first video. For example, the single user interface may form a video "stack" with the second video being added to the stack at a next position in the stack, such as below or beside the first video.

In response to the playback module 108 playing a portion of the second video corresponding to 8:10:01 AM to 8:12:00 AM, the playback module 108 may cease playing the first video as it has no content for that part of the common timeline. In one embodiment, the first video may be dynamically removed from the video stack when there is no image to present resulting in the second video dynamically moved to replace the first video. A third video may dynamically be added, stacked below the second video, and so forth.

Dynamically adding a video may involve moving a position within the user interface of those videos currently playing to make room in a visible portion of the user interface for the video being added. Additionally, one or more of the videos currently playing may be resized to make room in a visible portion of the user interface for the video being added. Videos may also be dynamically added in response to newly uploaded videos matching the search query, to user selection of additional videos, network/operator determination that another video is relevant to those being viewed, and the like. Likewise, videos may be dynamically removed when they no longer have content to be played (e.g., with reference to the common timeline), when unselected by a user, etc.

In one embodiment, a video being added may "slide" into the video stack. For example, the second video may appear to slide in from the left-hand side of the screen into a position below the first video. As another example, the third video may appear to slide in from the bottom of the screen into a position below the second video. Similarly, a video being removed may "slide" out of the video stack. In another embodiment, a video being added may "fade" into the video stack and a video being removed may "fade" out of the video stack. Note that the above descriptions of adding/removing a video are exemplary only and the videos may be dynamically added/removed involving other visual effects.

In one embodiment, the order of the videos in the video stack may be determined by a first playback position within the common timeline. Here, the first video would occupy a "top" position in the video stack as its playback begins before the second video. In another embodiment, the order of the videos in the video stack may be determined by geo-location (e.g., nearest to the event/action being recorded), video quality (e.g., high definition videos located "above" lower definition videos in the video stack), user preference, and the like. As used herein, the "top" of the video stack refers to most prominent position. The "top" video in the stack may be displays in the uppermost location of the user interface (or viewable portion of the interface), a rightmost location, a leftmost location, a center-most location, or the like according to preference of the viewing user and/or a host providing the playback platform (e.g., an operator of the server 114 or a media player used to playback the videos).

Typically, audio for the multiple videos will be from only the "top" video with the other videos being muted. When a video providing the audio (e.g., the non-muted video) is dynamically removed, the next video on the stack may be selected to provide the audio for the video stack. In certain embodiments, the audio of the next video may be analyzed to determine volume levels, etc. to provide a seamless audio transition from the top video to the next video.

In some embodiments, none of the selected videos may contain a content corresponding to a playback time on the common timeline. In response to none of the videos containing a portion corresponding to a certain playback time, the playback module 108 may skip ahead during playback to a time on the common timeline where at least one video contains a content to present. In this manner, the playback module 108 may play the one more videos and skip gaps in the common timeline, thus allowing a user to view continuously even where the one or more videos may contain a gap common to all of the one or more videos.

In one embodiment, the playback module 108 may determine the earliest time where all of the multiple videos contain a portion corresponding to that time (e.g., where all selected videos overlap in time on the common timeline). In a further embodiment, the playback module 108 may begin playing the videos at that earliest common time. In one embodiment, the playback module 108 may determine the latest time where all of the multiple videos contain a portion corresponding to that time (e.g., where all selected videos overlap in time on the common timeline). In a further embodiment, the playback module 108 may stop playing the videos at that latest common time. In one embodiment, a user of the client device 118 may customize when each video begins playing and when each video ceases playing.

In one embodiment, the playback module 108 may receive a hyperlink, a uniform resource locator (URL), or the like from the selection module 106. In response to a user entering the hyperlink into a browser or an application on a device, the playback module 108 may retrieve the videos selected by the selection module 106 and play the videos in a single user interface, as described above. The hyperlink content may be based, at least in part, on the one or more videos selected by the selection module 106.

In one embodiment, the playback module 108 may require a user to log into an account in order to play the one or more selected videos. The account may include an account for a software application, an app, a third-party server, a social networking platform, or the like. In response to the user logging into an account, the playback module 108 or another module may display one or more possible actions the user may take. For example, in response to the user logging in, the playback module 108 or another module may allow a user to record video using the recording module 102 or some other recording software, upload video and/or metadata files, view recorded video (recorded by the user or by other user), search for videos as described above, and/or watch one or more videos played by the playback module 108 as described above.

Figure 2A:
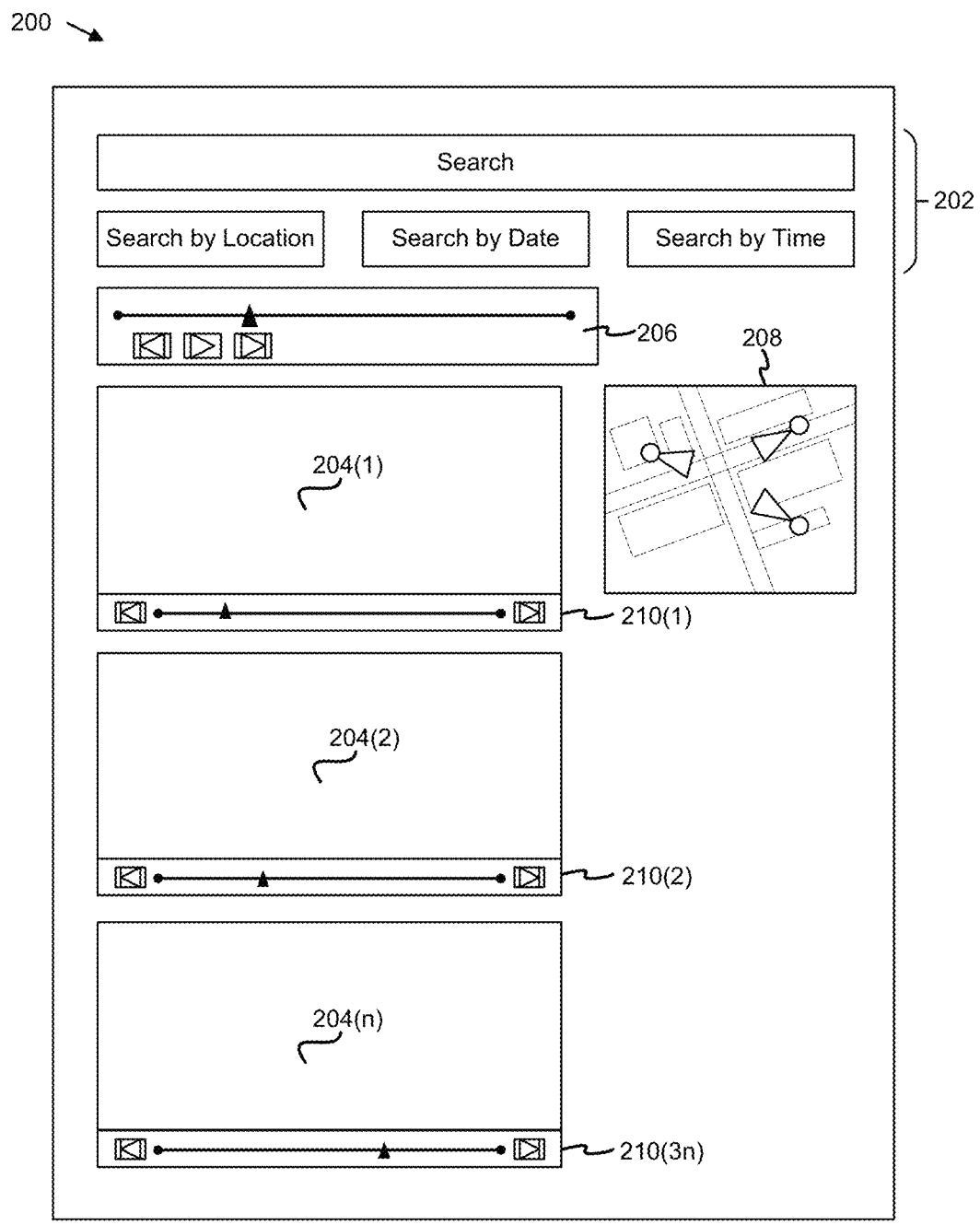
FIG. 2A is a diagram illustrating one embodiment of a user interface for multiple independent video recording integration.

FIG. 2A depicts one embodiment of a graphical display 200 for multiple independent video recording integration. The graphical display 200 is one embodiment of the single user interface for synchronized playback of multiple independent videos. The graphical display 200 may be provided by a standalone media player or may be a media player integrated into a website, a social networking platform, or other network portal. As depicted, the graphical display 200 may include a search interface 202, one or more videos 204(1)-(n), a playback navigation interface 206, a map 208, and one or more playback interfaces 210(1)-(n).

In one embodiment, the playback module 108 may include the graphical display 200. For example, the playback module 108 may generate the graphical display 200. In another embodiment, the graphical display 200 may include the playback module 108. For example, the graphical display 200 be integrated into a software program such as a computer program or an app. In a further embodiment, the graphical display 200 may be integrated into a web browser or may be part of a website displayed on a web browser. The graphical display 200 may be displayed on a computer such as a laptop or a desktop, a mobile device such as a smart phone or tablet, or any other device with a screen, as described above in connection with the one or more recording devices 110(1)-(n) and/or client device 118.

FIGS. 2B and 2C depict one embodiment of a graphical display 212 for a mobile device for multiple independent video recording integration. The graphical display 212 may include at least some of the elements of the graphical display 200 of FIG. 2A, denoted using like reference numbers. In one embodiment, the graphical display 212 may include the search interface 202, one or more videos 204(1)-(n), the playback navigation interface 206, one or more playback interfaces 210(1)-(n). Although not depicted in FIGS. 2B and 2C, the graphical display 240 may include the map 208.

In one embodiment, the mobile device may include a touch screen. A user touching and sliding on the touch screen may scroll up or down on the graphical display 212 to reveal one or more videos 204(1)-(n) not currently displayed. For example, as depicted in FIG. 2B, less than all of the videos 204(1)-(n) may be visible on the graphical display 212. Scrolling up may reveal one or more of the one or more videos 204(1)-(n) and one or more of the videos 204(1)-(n) that were previously visible may no longer be visible, as depicted in FIG. 2C. In some embodiments, in response to the user scrolling, one or more portions of the graphical display 212 may remain on the graphical display. For example, as depicted in FIG. 2C, the playback navigation interface 206 may remain visible in response to the user scrolling up. In one embodiment, in response to scrolling to the side (scrolling horizontally), the graphical display 212 may reveal the map 208 and may cease to display some or all of the one or more videos 204(1)-(n).

Although the graphical display 200 and the graphical display 212 are separately depicted in FIGS. 2B and 2C, the graphical displays 200 and 212 may share much of the same functionality. Thus, as discussed herein, the concepts and functions described in relation to graphical display 200 may be applicable to graphical display 212. In one embodiment, the playback module 108 may include and/or generate the graphical display 212. In another embodiment, the graphical display 212 may be include the playback module 108, e.g., integrated into a software program implementing the playback module 108. Further, the graphical display 212 may be integrated into a web browser or may be part of a web site displayed on a web browser.

Returning to FIG. 2A, in one embodiment, the graphical display 200 may include a search interface 202. A user may input data into the search interface 202. In one embodiment, the search interface 202 may include one or more search boxes. Each of the one or more search boxes may correspond to different types of information.

As depicted in FIG. 2A, the search interface 202 may include search boxes for location, dates, times, titles and/or descriptions, metadata tags, usernames and/or producer information, or the like. The user may input text or other parameters into the search boxes of the search interface 202. For example, the user may input text in the location search boxes specifying one or more locations. A location may include latitude/longitude, an address, a city, a country, a landmark, or the like. The user may input text in the time search box specifying one or more times. The one or more times may include a time, a range of times, or the like. The user may input text in the date box specifying one or more dates. The one or more dates may include a date, a range of dates, or the like. In one embodiment, a search box may include prepopulated data that a user may select.

In one embodiment, in response to processing the search query, the playback module 108 may receive one or more videos 204(1)-(n) as search results. In one embodiment, the playback module 108 may present a subset of one or more videos 204(1)-(n) to a user. The subset may include a first video 204(1) and a second video 204(2). In one embodiment, the playback module 108 may receive user selection of the first video 204(1) and the second video 204(2). The playback module 108 may receive the user's selection in response to a user interacting with the search results. For example, the user may click on the search results, touch the search results on a touch screen, or the like.

In one embodiment, the graphical display 200 may include one or more videos 204(1)-(n). The one or more videos 204(1)-(n) may include the videos selected by the selection module 106 and sent to the playback module 108. The playback module 108 may play the one or more videos 204(1)-(n), for example in a synchronized manner. The graphical display 200 may include any number of videos 204(1)-(n).

In one embodiment, the one or more videos 204(1)-(n) may be arranged vertically, as depicted in FIGS. 2A-2C. In another embodiment, the one or more videos 204(1)-(n) may be arranged horizontally, as depicted in FIG. 3C. In one embodiment, the one or more videos 204(1)-(n) may be arranged in a grid or in rows and columns, as depicted in FIG. 3D.

In certain embodiments, the one or more videos 204(1)-(n) may not all fit onto one screen of the graphical display 200. The graphical display 200 may display one or more videos 204(1)-(n) that are not initially visible on the screen in response to a user scrolling, sliding on a touchscreen, or the like. In some embodiments, a user may adjust the size of each video of the one or more videos 204(1)-(n). In one embodiment, a user may adjust the position of the one or more videos 204(1)-(n).

The graphical display 200 may arrange the one or more videos 204(1)-(n) in a variety of ways. In one embodiment, the graphical display 200 may arrange the one or more videos 204(1)-(n) according to location, start time, end time, length of video, or the like. In one embodiment, the user may reorder the sequence of the one or more videos 204(1)-(n) within the graphical display 200.

In some embodiments, each video of the one or more videos 204(1)-(n) includes audio separate from the other one or more videos 204(1)-(n). Each video may include a volume control and the volume of a video may adjust in response to a user adjusting the interacting with the volume control of the video. In one embodiment, the playback module 108 may initially playback audio from a video in a default location (e.g., the top-most and/or right-most video) while muting the audio of the other videos. In another embodiment, the playback module 108 may, as a default, playback the audio from all the synchronized videos.

In certain embodiments, each video of the one or more videos 204(1)-(n) may include a sound focus button. In response to a user pressing a sound focus button, the playback module 108 may mute the volume of the one or more videos 204(1)-(n) except for the video that corresponds to the sound focus button the user pressed. For example, a user may press the sound focus button associated with the video 204(1). In response, the playback module 108 may mute the volume of the videos 204(2)-(n).

In one embodiment, the graphical display 200 may not display a video of the one or more videos 204(1)-(n) in response to the video not containing a portion corresponding to the current playback time on the common timeline. For example, the video not containing a portion corresponding to the current playback time may be dynamically removed from the graphical display 200. Where the videos 204(1)-(n) are presented in a video stack (either vertical or horizontal), the video not containing a portion corresponding to the current playback time may be automatically removed from the stack and a next video in the collection of videos 204(1)-(n) moved into the vacated position in the stack creating a dynamic video playback environment.

In response to that video again containing a portion corresponding to the current playback time, the graphical display 200 may display and play the video. For example, the video again containing a portion corresponding to the current playback time may be dynamically added to the graphical display 200. Where the videos 204(1)-(n) are presented in a video stack, the video again containing a portion corresponding to the current playback time may be dynamically added to the stack—either to its original position or to the last position in the stack.

In one embodiment, the graphical display 200 may display user/producer information for each video of the one or more videos 204(1)-(n). The user/producer information may include the username of the user that uploaded and/or recorded the video, the name of the user that recorded and/or uploaded the video, or the like.

Figure 2D:
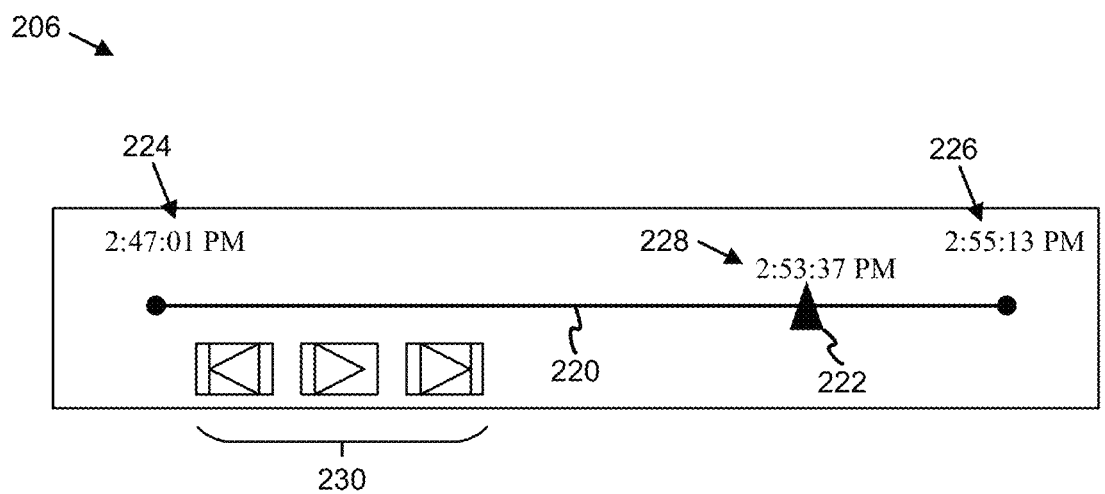
FIG. 2D is a diagram illustrating one embodiment of a navigation and control interface for multiple independent video recording integration.

FIG. 2D depicts one embodiment of a playback navigation interface 206 for multiple independent video recording integration. The playback navigation interface 206 may include a slider element that includes a navigation bar 220 and a current playback position indicator 222. The playback navigation interface 206 may include a start time 224, an end time 226, and a current playback time 228. The navigation interface may include one or more media control buttons 230.

The navigation bar 220 may include a line that represents the playback of the one or more videos 204(1)-(n). In one embodiment, the navigation bar 220 may change colors in response to the playback module 108 playing certain videos or a certain amount of videos. For example, in response to the playback module 108 playing one video, the navigation bar 220 may include a first color. In one embodiment, in response to the playback module 108 playing two or more videos, the navigation bar 220 may change to a second color different from the first color. The current playback position indicator 222 may indicate where in the common timeline the playback of the one or more videos 204(1)-(n) is currently at.

The start time 224 may include the start time of the one or more videos 204(1)-(n). In one embodiment, the start time 224 may include the earliest start time of the one or more videos 204(1)-(n). In one embodiment, the start time 224 may include a start time 224 chosen by the user. The end time 226 may include the end time of the one or more videos 204(1)-(n). In one embodiment, the end time 226 may include the latest end time of the one or more videos 204(1)-(n). In one embodiment, the end time 226 may include an end time 226 chosen by the user. The current playback time 228 may indicate the time of the current position indicated by the current playback position indicator 222.

In one embodiment, the start time 224, the end time 226, and/or the current playback time 228 may include times corresponding to the times the one or more videos 204(1)-(n) were recorded. The times may include a time zone indication. In certain embodiments, the start time 224 and the end time 226 may be adjusted to a local time zone of the viewer.

In one embodiment, the start time 224 and the end time 226 may include playback times relative to the common timeline. Where the adjusted start time 224 is 00:00, the adjusted end time 226 will be the difference between the end time 226 and start time 224. For example, if the start time 224 is 2:47:01 PM and the end time 226 is 2:55:13 PM, then the adjusted start time may be 00:00 and the adjusted end time may be 8:12. In the previous example, the adjusted current playback time 228 may include a time between 00:00 and 8:12.

In one embodiment, a user may adjust the current playback position of the one or more videos 204(1)-(n). A user may slide the current playback position indicator 222 to adjust the current playback position of all of selected videos 204(1)-(n). A user may interact with the slider element (for example, by clicking, touching on a touchscreen, or the like on the navigation bar 220) to move the current playback position indicator 222 to a certain playback position. In response to the user adjusting the current playback position in the playback navigation interface 206, all of the one or more videos 204(1)-(n) may each adjust their current playback to the portion of the video 204(1)-(n) corresponding to the current playback time. The current playback time 228 may update in response to the user adjusting the current playback position.

For example, as depicted in FIG. 2A, the current playback position indicator 222 may indicate that the current playback time 228 is 2:53:37 PM. A user may adjust the current playback position indicator 222 to the position at 2:50:00 PM. In response to the user adjusting the current playback time to the position at 2:50:00 PM, all of the one or more videos 204(1)-(n) may each adjust their current playback to the portion of the video 204(1)-(n) corresponding to 2:50:00 PM.

In one embodiment, the playback navigation interface 206 may include one or more media control buttons 230. The media control buttons 230 may include a play button, a fast-forward button, and a rewind button. In one embodiment, the playback module 108 may play the one or more videos 204(1)-(n) and, in response to the user pressing the play/pause button, the playback module 108 may pause all of the videos of the one or more videos 204(1)-(n). In response to the user pressing the play/pause button where the videos are paused, the playback module 108 may resume playing all the videos of the one or more videos 204(1)-(n). In one embodiment, in response to the user pressing and/or holding the fast-forward button, the playback module 108 may fast forward or skip ahead all of the videos of the one or more videos 204(1)-(n). In one embodiment, in response to the user pressing and/or holding the rewind button, the playback module 108 may rewind or skip back all of the videos of the one or more videos 204(1)-(n). The fast-forward and/or rewind may be at any speed.

In one embodiment, although not depicted, the one or more media control buttons 230 may include a live button. In a further embodiment, the playback navigation interface 206 may display the live button in response to the playback module 108 playing one or more videos 204(1)-(n) that are being uploaded in real time. In response to a user pressing the live button, the playback module 108 may playback the one or more videos 204(1)-(n) in real time.

In certain embodiments, the presence of one or more videos 204(1)-(n) being uploaded in real time may change the functionality of one or more components of the playback navigation interface 206. For example, in one embodiment, the fast-forward button may not allow the user to fast-forward the one or more videos 204(1)-(n) passed the current time of the one or more videos 204(1)-(n) being uploaded in real time.

In one embodiment, the graphical display 200 may include a map 208. The map 208 may include a map that displays the one or more recording locations of the one or more videos 204(1)-(n). The recording location may be identified by geo-location metadata of the videos 204(1)-(n). For example, in one embodiment, the map 208 may display a circle or some other icon to represent a recording location of a video for each video of the one or more videos 204(1)-(n).

In one embodiment, the map 208 may include a graphical representation of the direction of recording of each video of the one or more videos 204(1)-(n). For example, as depicted in FIG. 2A, the map 208 may represent the direction of recording of each video, here depicted as a triangle extending away from a recording location icon. In one embodiment, the graphical display 200 may include a map 208 for each video of the one or more videos 204(1)-(n). In one embodiment, the icons representing a location where a video was filmed may include different icons for recorded videos than the icons for videos being uploaded in real time (e.g., live recordings).

In one embodiment, a user may interact with the map 208 to adjust the map. In one embodiment, the user may zoom in or out on the map 208 to reveal more or less of the map 208. In one embodiment, the user may scroll to reveal one or more portions of the map 208.

In one embodiment, the graphical display 200 may include one or more playback interfaces 210(1)-(n). Each video of the one or more videos 204(1)-(n) may include a playback interface 210(1)-(n). Each playback interface 210(1)-(n) depicts playback of the associated video 204(1)-(n). Here, the playback interfaces 210(1)-(n) may show the individual playback progress of the video, while the playback navigation interface 206 displays the overall playback (e.g., relative to the common timeline).

In certain embodiments, the playback interface 210(1)-(n) may include one or more buttons, slider elements, or the like to adjust the playing of a video. For example, the playback interface 210(1)-(n) may include a forward button. Here, the individual controls may be bound to the playback navigation interface 206, such that adjustment at the playback interface 210 of an individual video results in adjustment to the playback navigation interface 206. Note that the playback navigation interface 206 controls playback of the videos 204(1)-(n), collectively.

In response to a user pressing the forward button, the video may skip forward in the video playback by a certain amount of time. The amount of time may include any interval of time such as one second, three seconds, one minute, or any amount of time. In certain embodiments, the interval of time is user defined. As discussed above, during synchronized playback of the videos 204(1)-(n), the user pressing the forward button may skip forward in the video playback of all the videos 204(1)-(n).

In one embodiment, the playback interface 210(1)-(n) may include a backward button. In response to a user pressing the backward button, the video may skip backward in the video playback by a certain amount of time. The amount of time may include any interval of time, including a user-defined interval of time. As discussed above, during synchronized playback of the videos 204(1)-(n), the user pressing the backward button may skip backward in the video playback of all the videos 204(1)-(n).

In one embodiment, the playback interface 210(1)-(n) may include a slider element. The slider element may indicate the current playback time of the associated video 204(1)-(n). In response to the user moving the slider element, the video 204(1)-(n) may jump forward or backward to the playback time indicated by the slider element. In certain embodiments, the user may manually synchronize playback of the one or more videos 204(1)-(n) using the slider element, adjusting (e.g., fine-tuning) playback of one video relative to the others. In this manner, the user may adjust the playback of one video of the one or more videos 204(1)-(n), and thus the video may become more synchronized with the other videos (e.g., through manual timing alignment using the playback interface 210) of the one or more videos 204(1)-(n) according to the user's preferences.

In some embodiments, the selection module 106 and/or playback module 108 may automatically synchronize the one or more videos 204(1)-(n) using a synchronization event selected by the viewing user. The synchronization event may be a visual event (e.g., the start of a race), an audio event (e.g., a shout or whistle), and the like. In response to the user selecting the synchronization event in one video of the videos 204(1)-(n), the selection module 106 and/or playback module 108 analyze the others of the videos 204(1)-(n) for corresponding visual events, audio events, etc. In this manner, the synchronized playback of the one or more videos 204(1)-(n) is improved.

In one embodiment, the one or more playback interfaces 210(1)-(n) may adjust a start time and/or end time of a video of the one or more videos 204(1)-(n). In certain embodiments, in response to a user adjusting the play of the one or more videos 204(1)-(n), the playback module 108 may add that adjustment to the metadata of the one or more videos 204(1)-(n) and/or may update the metadata to reflect the adjustment. The adjusted metadata may be uploaded to the storage module 104, the server 114, and/or the database 116.

In one embodiment, although not depicted, the graphical display 200 may include one or more advertisements. An advertisement may include a video advertisement, a static advertisement, or the like. In one embodiment, a static advertisement may include text, images (including moving images), hyperlinks, or the like. An advertisement may include audio and may include an interface to adjust the volume of the audio or mute the audio. The graphical display 200, the playback module 108, or the like may receive the advertisement from the server 114, the database 116, or another location such as a third-party server.

In one embodiment, an advertisement may be disposed above, below, or to the side of the one or more videos 204(1)-(n). In one embodiment, an advertisement may overlay a video 204(1)-(n). For example, the advertisement may include a static advertisement that is disposed over a portion of a video 204(1)-(n). In one embodiment, an advertisement may be disposed in the place of one or more videos 204(1)-(n). The graphical display 200 may display the advertisement before, during, or after playing one or more videos 204(1)-(n).

For example, in one embodiment, before, during, or after the playback module 108 plays a first video 204(1), the playback module 108, the graphical display 200, or the like may play a video advertisement and the video advertisement may be disposed on the graphical display 200 where graphical display 200 displays the first video 204(1). In certain embodiments, in response to playing a video advertisement during playback of a video 204(1)-(n), the playback module 108 may pause the playback of one or more videos 204(1)-(n). In one embodiment, the playback module 108 may pause all the videos 204(1)-(n).

In one embodiment, a video advertisement may play during playback of one or more videos 204(1)-(n). For example, a first video 204(1) may have an end time at 2:15:00 PM and a second video 204(2) have an end time at 2:16:00 PM. In one embodiment, in response to the first video 204(1) playback reaching 2:15:00 PM, the graphical display 200 may cease displaying the first video 204(1) and may play a video advertisement disposed on the graphical display 200 where the first video 204(1) was displayed. The video advertisement may play while the second video 204(2) is still playing. In one embodiment, the video advertisement may play when none of the one or more videos 204(1)-(n) play. In one embodiment, the advertisement may not include audio in order to not overlap with the audio of the one or more videos 204(1)-(n). In one embodiment, in response to none of the one or more videos 204(1)-(n) playing, an advertisement may play audio.

Figure 2E:
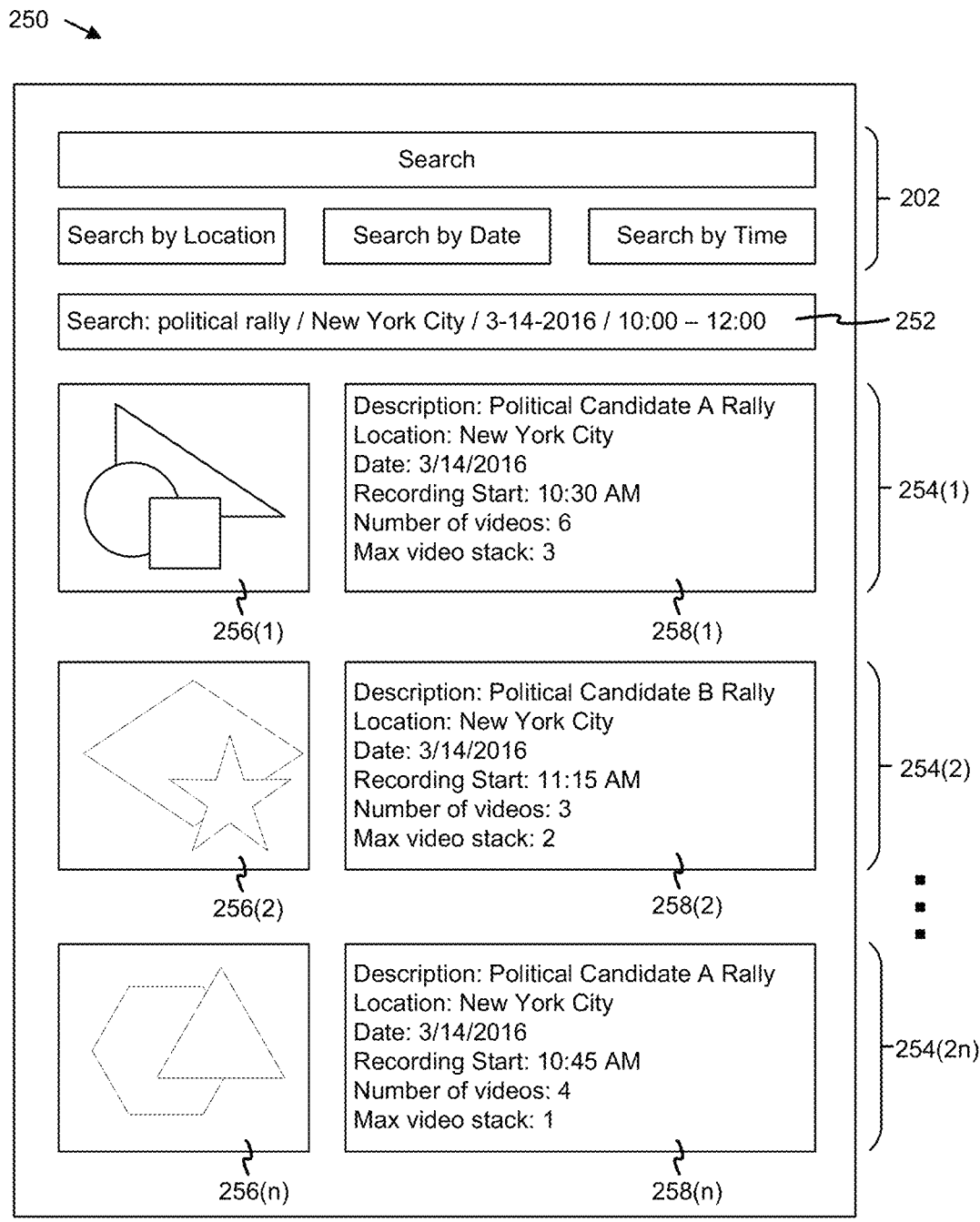
FIG. 2E is a diagram illustrating another embodiment of a user interface for multiple independent video recording integration.

FIG. 2E depicts one embodiment of a graphical display 250. The graphical display may 250 include a user interface. In one embodiment, the graphical display 250 may include the search interface 202. In one embodiment, the graphical display 250 may include a search string 252. The graphical display may display the search string 252 below the search interface 202. In one embodiment, the graphical display 250 may display the search string 252 in response to the user executing a search using the search interface 202. The search string 252 may include parameters, data, information, or the like, that a user searched for. For example, in one embodiment, parameters in the search string may correspond with metadata associated with videos that the user searched for. The metadata may include video description, a video creator, a reference time, a geo-location of recording, a direction and/or altitude of recording, or the like.

In one embodiment, the graphical display 250 may include one or more search results 254(1)-(n). In one embodiment, the search results 254(1)-(n) may each include a video block. A video block may include one or more videos, such as the videos 204(1)-(n), that may be linked. Videos may be linked in response to user input, an automatic process (e.g. a software process of the storage module 104, selection module 106, server 114, or the like), input from a social networking platform, or the like. In one embodiment, the selection module 106 may link one or more videos in response to a user search. The linking may include a temporary linking or a permanent linking. For example, in one embodiment, the selection module 106 may linked videos based, at least in part, on the videos including similar metadata such as similar descriptions, geo-locations, reference times, or the like.

In one embodiment, the search results 254(1)-(n) may include a thumbnail 256(1)-(n). The thumbnail 256(1)-(n) may include an image, video clip, or the like from a video of the video block. In one embodiment, the selection module 106 or the like may select the thumbnail 256(1)-(n). In some embodiments, a user may select the thumbnail 256(1)-(n).

In some embodiments, the search results 254(1)-(n) may each include a search result description 258(1)-(n). The search result description 258(1)-(n) may include information about the search result 254(1)-(n). In one embodiment, the search result description 258(1)-(n) may include one or more descriptions of the one or more videos 204(1)-(n) of the search result 254(1)-(n). In one embodiment, the search result description 258(1)-(n) may include one or more geo-location of the one or more videos 204(1)-(n). In one embodiment, the search result description 258(1)-(n) may include one or more reference times of the one or more videos 204(1)-(n). For example, the reference times may include a date, start time, end time, duration, timestamp, or the like.

In some embodiments, the search result description 258 (1)-(n) may include a number of videos in the search result 254(1)-(n). For example, the search result 245(1)-(n) may include a video block. The number of videos in the search result 254(1)-(n) may include the number of videos in the video block. In one embodiment, the search result description 258(1)-(n) may include a maximum number of videos that can be watched simultaneously. The maximum number of videos may be called the maximum video stack. The maximum video stack may include the highest number of videos that play simultaneously in the video block. In some embodiments, the maximum video stack may be set by a user. In one embodiment, the storage module 104, selection module 106, server 114, or the like may determine the maximum video stack.

In one embodiment, a user may interact with a search result 254(1)-(n) to view the videos 204(1)-(n) of the search result 254(1)-(n). In some embodiments, the user may interact with a search result 254(1)-(n) to view a list of videos 204(1)-(n) of the search result 254(1)-(n). In one embodiment, the search results 254(1)-(n) including one or more video blocks may provide a user with a greater number of videos 204(1)-(n) and with videos 204(1)-(n) that are similar to, but not identical to, the user's search criteria. The increased number of relevant videos may allow a user to find more relevant synchronized videos to watch, which may enhance the user's experience.

Figure 3A:
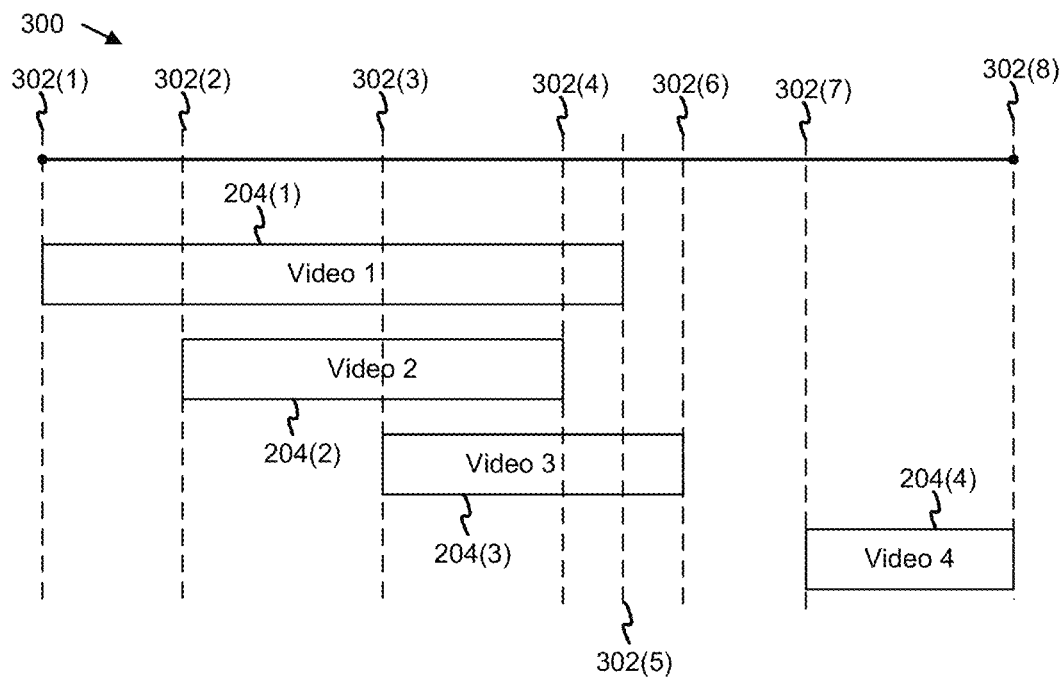
FIG. 3A is a block diagram illustrating one embodiment of a common timeline for integrating multiple independent video recordings.

FIG. 3A depicts one embodiment of a common timeline 300 for the graphical display 200 displaying one or more videos. The common timeline 300 from left to right represents the flow of time. In response to a video 204(1)-(4) containing a portion corresponding to the current playback, the playback module 108 may begin playback of the video 204(1)-(4). In response to the video 204(1)-(4) not containing a portion corresponding to the current playback, the playback module 108 stops playback of the video 204(1)-(4).

At time 302(1), the graphical display 200 plays back the first video 204(1) because the first video 204(1) contains a portion corresponding to the current playback time. At time 302(2), the graphical display 200 begins playback of the second video 204(2) while still playing the video 204(1). At time 302(3), the graphical display 200 begins playback of the third video 204(3) while still playing the first video 204(1) and the second video 204(2).

At time 302(4), the graphical display 200 may cease displaying the video 204(2) in response to the video 204(2) not containing a portion corresponding to the current playback time. At time 302(5), the graphical display 200 may cease displaying the first video 204(1) for the same reason. At time 302(6), the graphical display 200 may cease displaying the video 204(3). At this point, the graphical display 200 does not playback any video because none of the videos 204(1)-(4) contain content at this part of the common timeline.

From time 302(6) to 302(7), the playback module 108 may not play a video. In some embodiments, the playback module 108 may skip ahead to a time where the playback module 108 plays at least one video (here time 302(7)). At time 302(7), the graphical display 200 begins to playback the fourth video 204(4). At time 302(8), the graphical display 200 may cease to display the fourth video 204(4).

FIGS. 3B-E depict some embodiments of a graphical display 350. The graphical display 350 may include a user interface. The user interface may be a single user interface, for example the interface of a media player. The graphical display 350 may include at least some of the elements of the graphical display 200 of FIG. 2A, denoted using like reference numbers. As discussed herein, the concepts and functions described in relation to graphical display 200 may be equally applicable to graphical display 350. For example, in response to a video containing or not containing video corresponding to a current playback time, the graphical display 350 may dynamically present, remove, and/or rearrange one or more videos. In some embodiments, a user interface for a social networking platform, such as a social networking platform described below in reference to FIG. 6, may include the graphical display 350. For example, the playback module 108 may provide the graphical display 350 within a standalone interface or embedded within another interface, such as provided by a social networking platform.

In one embodiment, the graphical display 350 may include the playback navigation interface 206. The graphical display 350 may include one or more videos 204(1)-(n). The graphical display 350 may include the one or more playback interfaces 210(1)-(n) associated with their respective videos 204(1)-(n). In one embodiment, as described above, as the one or more videos 204(1)-(n) playback, the graphical interface 350 may dynamically add and/or remove a video may from the graphical display 350 as the video respective begins playback and ends playback. The graphical display 350 may arrange the one or more videos 204(1)-(n) in a variety of different ways. In one embodiment, the graphical display 350 is provided by an application or web page for interfacing with a social networking platform, as described below with reference to FIG. 6. In another embodiment, the graphical display 350 may be provided within additional video content, as described below with reference to FIGS. 7-8.

Figure 3B:
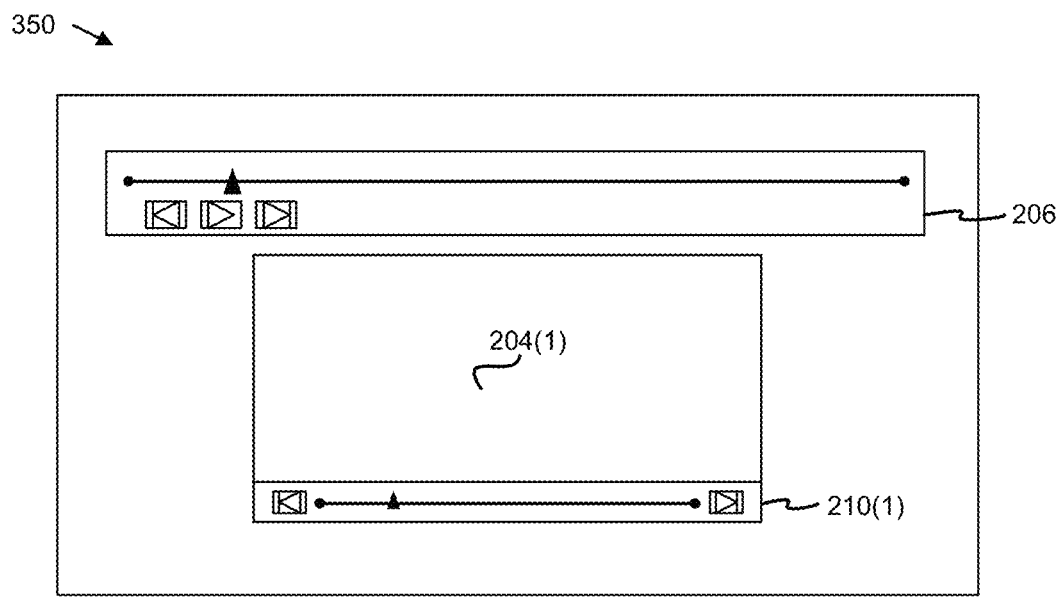
FIG. 3B is a diagram illustrating one embodiment of a user interface playing back multiple independent video recordings at a first point in time.
Figure 3C:
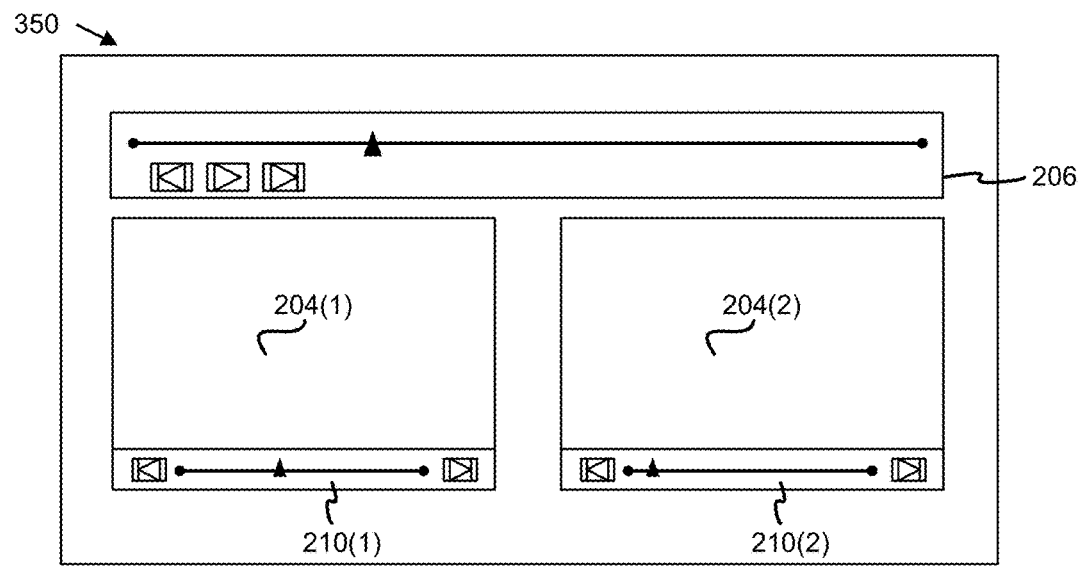
FIG. 3C is a diagram illustrating the user interface of FIG. 3B at a second point in time.
Figure 3D:
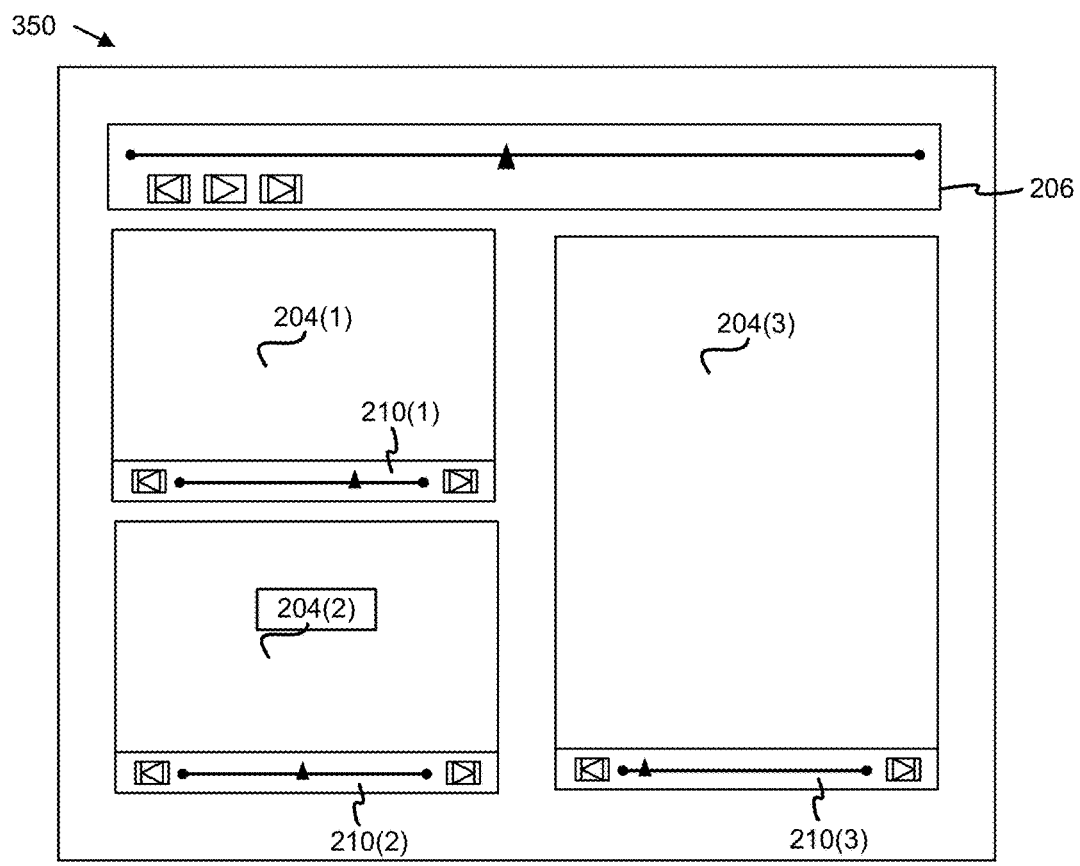
FIG. 3D is a diagram illustrating the user interface of FIG. 3B at a third point in time.

As depicted in FIG. 3B, in one embodiment, the graphical display 350 may present a first video 204(1). For example, the graphical display 350 may present the first video 204(1) in response to the first video 204(1) containing video corresponding to the current playback time. The first video 204(1) begins playback. In certain embodiments, no other videos may appear on the graphical display 300, for example due to no other videos overlapping in time with the first video 204(1). FIG. 3B may be one embodiment of synchronized playback between times 302(1) and 302(2).

As depicted in FIG. 3C, in one embodiment, the playback may reach the time where a second video 204(2) contains video corresponding to the current playback time. In response, the graphical display 350 may present the second video 204(2), such as in a video stack as described above in relation to FIG. 2A. The graphical display 350 may present the first video 204(1) and the second video 204(2) in adjacent locations within the user interface. For example, the graphical display 350 may present the second video 204(2) to the side of, above, below the first video 204(1) or the like. FIG. 3C may be one embodiment of synchronized playback between times 302(2) and 302(3).

In one embodiment, the graphical display 350 may present the one or more videos 204(1)-(n) in different sizes, dimensions, or the like. For example, as depicted in FIG. 3D, in response to a third video containing video corresponding to the current playback time, the graphical display may add a third video 204(3) to the video stack and present the third video 204(3). In the depicted embodiment, the graphical display 350 presents the first video 204(1) above the second video 204(2) and may present the third video 204(3) to the side of the first video 204(1) and the second video 204(2). Other arrangements may be used; the location of each video 204(1)-(3) may be dictated by the video stack order. FIG. 3D may be one embodiment of synchronized playback between times 302(3) and 302(4).

Figure 3E:
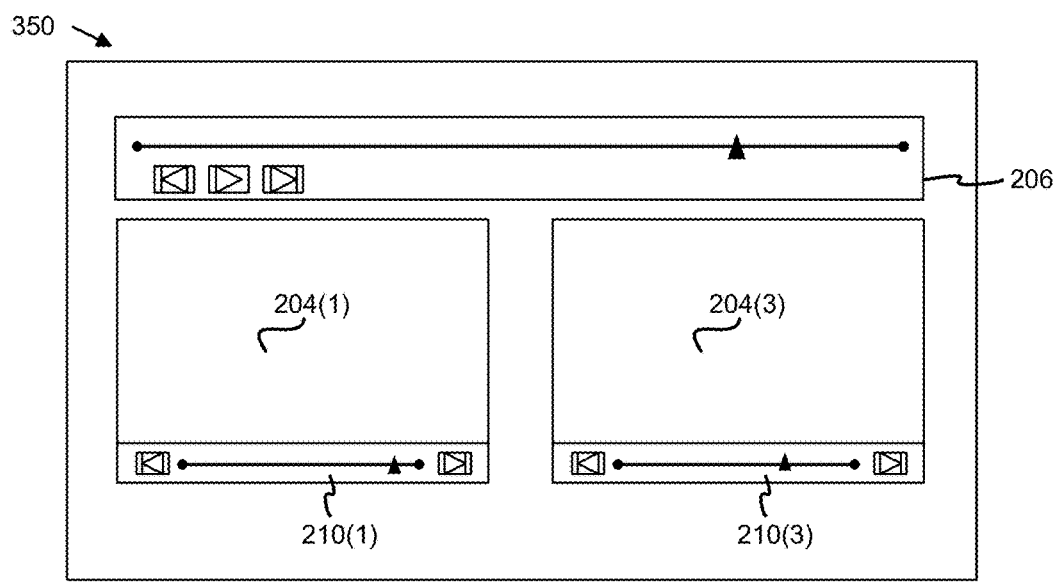
FIG. 3E is a diagram illustrating the user interface of FIG. 3B at a fourth point in time.

As depicted in FIG. 3E, the second video 204(2) may cease playback and, in response, the graphical display 350 may remove the second video 204(2). The graphical display 350 may rearrange the one or more videos 204(1)-(n) that are still in playback. For example, the graphical display 350 may present the first video 204(1) and the third video 204(3) side-by-side. The graphical display 350 may dynamically add and remove videos to or from the stack and rearrange one or more videos in the stack in response to one or more videos containing or not containing video corresponding to the playback time. For example, the graphical display 350 may dynamically move the third video 204(3) below the second video 204(2). FIG. 3E may be one embodiment of synchronized playback between times 302(4) and 302(5).

In one embodiment, a user may create a composite video that includes one or more segments from the one or more videos 204(1)-(n). The user may select a first video and a start time and end time for a segment of the first video. The user may select a second video and a start time and end time for a segment of the second video. The user may continue this process until the user has finished selecting video segments. A composite video generating module may combine the video segments selected by the user and generate a single video that includes the selected video segments. In the above embodiments, the terms "first video," "second video," etc. do not necessarily indicate different videos. For example, a user may select a first video, then a second video different from the first video, and then the first video again.

In one embodiment, the dynamic presentation, arrangement, and/or removal of video of the graphical display 350 as described above may occur in a user interface of a social networking platform. The social networking platform may dynamically present one or more videos to one or more users of the social networking platform. The one or more users may not be connected through the social networking platform (except, for example, that they use the social networking platform). The dynamic presentation, arrangement, and removal of videos from the graphical display 350 of the social networking platform user interface may allow different users to view different synchronized videos simultaneously even though no prior connection between the users may exist.

Figure 4A:
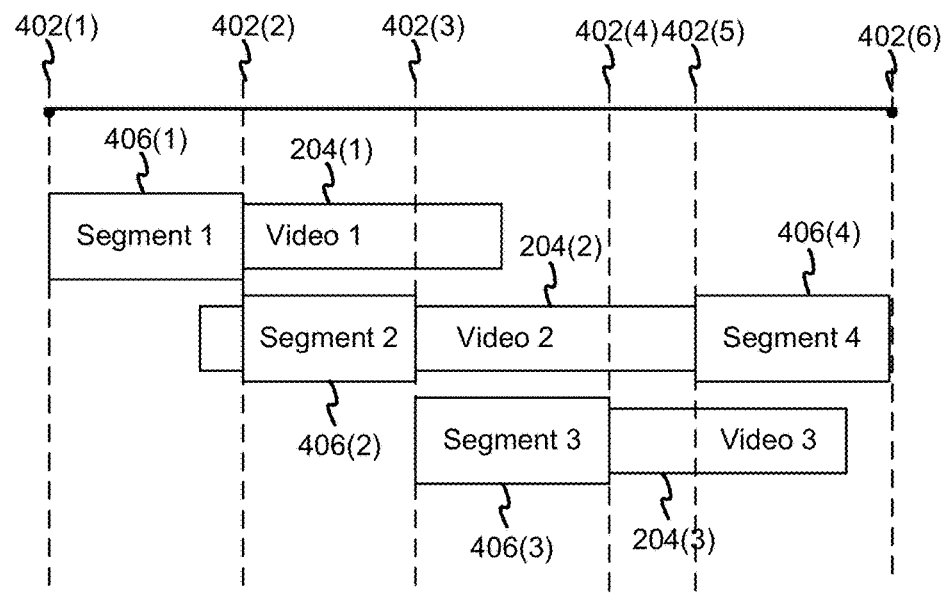
FIG. 4A is a diagram illustrating another embodiment of a timeline for compiling multiple independent video recordings.

FIG. 4A depicts one embodiment of a timeline 400 for the graphical display 200 displaying one or more videos for creating a composite video. The timeline 400 from left to right represents the flow of time. A user may select the first video 204(1) and/or may select time 402(1) as the start time for the first segment 406(1). At time 402(2), the user may select the second video 204(2) and/or may select time 402(2) as the end time for the first segment 406(1) and as the start time of the second segment 406(2). At time 402(3), the user may select the third video 204(3) and/or may select time 402(3) as the end time of the second segment 406(2) and as the start time of the third segment 406(3). At time 402(4), the user may select time 402(4) as the end time of the third segment 406(3). At time 402(5), the user may select the second video 204(2) and/or may select time 402(5) as the start time of the fourth segment 406(4). At time 402(6), the user may select time 402(6) as the end time of the fourth segment 406(4).

Figure 4B:
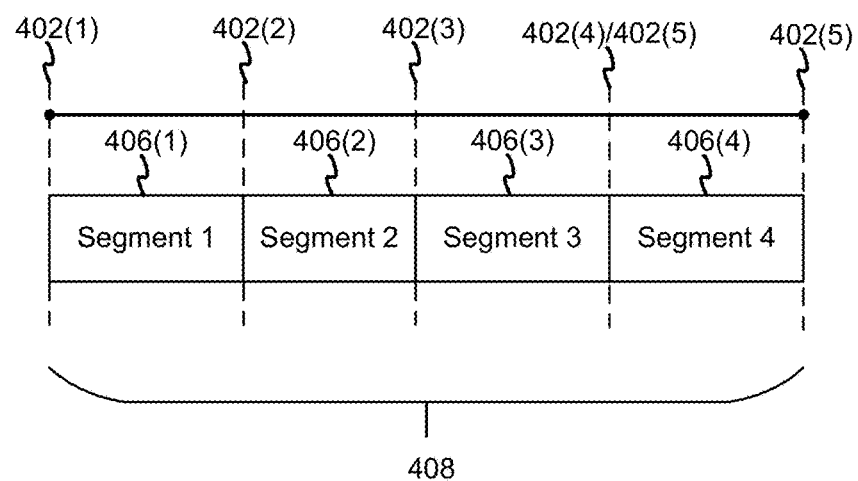
FIG. 4B is a is a diagram illustrating a compilation video created using the timeline of FIG. 4A.

FIG. 4B depicts a further embodiment of a timeline 400 for a composite video created from the segments as described in FIG. 4A. In one embodiment, the playback module 108 or another module may generate a composite video 408 from the one or more segments 406(1)-(4). The composite video 408 may include the one or more segments 406(1)-(4) in the order that the user selected the one or more videos 204(1)-(3) and/or selected the one or more segments 406(1)-(4).

Returning to FIG. 2A, in one embodiment, a user may interact with the graphical display 200 to adjust the graphical display 200. For example, as mentioned above, one or more portions of the graphical display 200, such as one or more videos of the one or more videos 204(1)-(n), the map 208, or the like may not be visible to the user because those portions may not fit on the screen displaying the graphical display 200. A user may interact with the graphical display to reveal these portions. For example, in response to a user scrolling with a mouse wheel, using one or more keys of a keyboard, or swiping on a touchscreen, the graphical display 200 may show one or more portions of the graphical display 200 that were previously not displayed.

Figure 5:
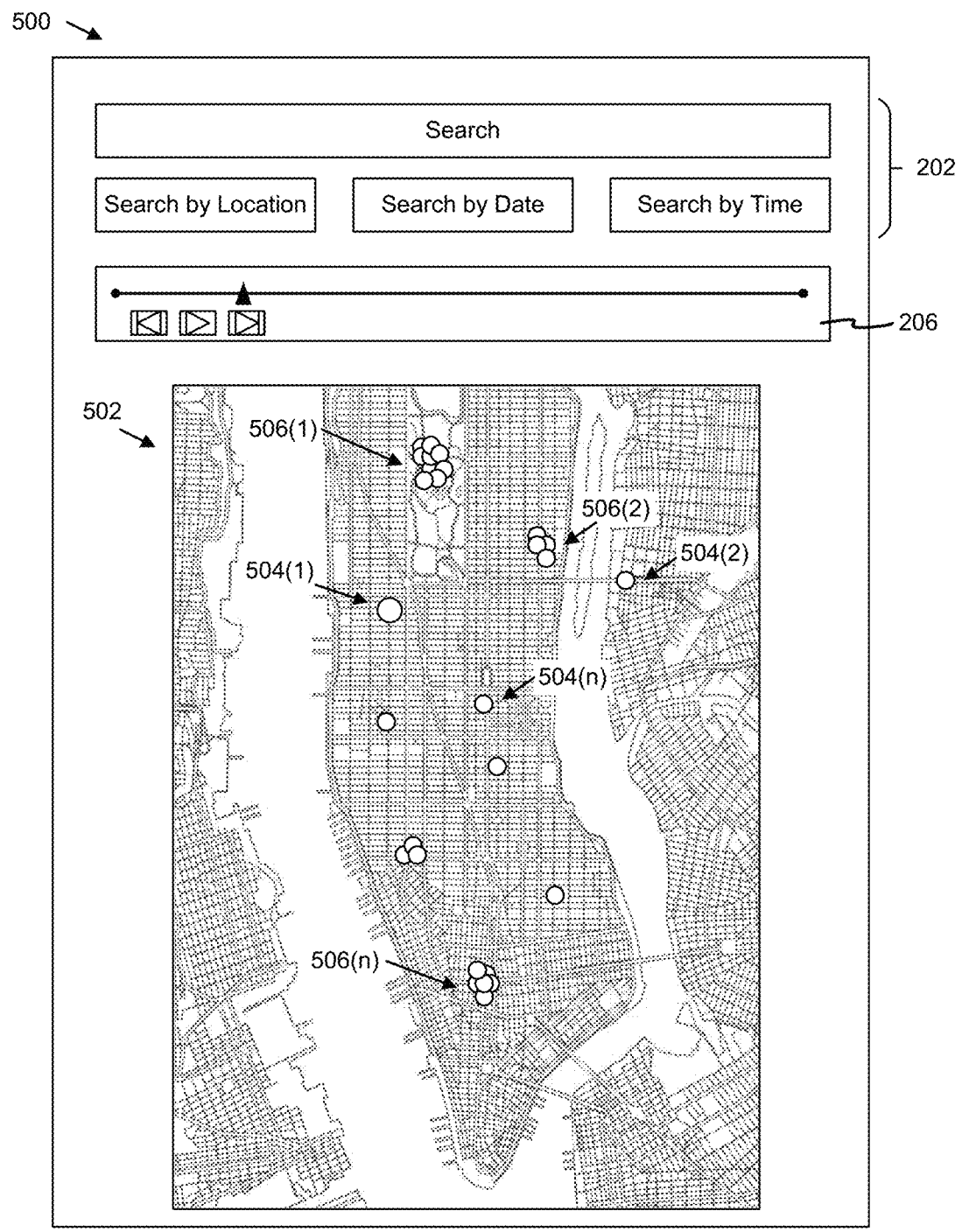
FIG. 5 is a diagram illustrating one embodiment of a map interface for multiple independent video recording integration.

FIG. 5 depicts one embodiment of a graphical display 500. The graphical display 500 may include a user interface. The graphical display 500 may include the search interface 202. The graphical display 500 may display the playback navigation interface 206. The graphical display 500 may include a map. The map may include a searchable map 502. The searchable map 502 may include an interactive map. The searchable map 502 may include an interface for interacting with the interactive map. For example, in one embodiment, a user may be able to zoom in and out of the map, navigate to different areas of the map, or the like. In one embodiment, the graphical display 500 may obtain the map from another software service. For example, the graphical display 500 may obtain the map from an application program interface (API) such as GOOGLE Maps, BING Maps, or the like. The graphical display 500 may display data or the like over the searchable map 502.

In one embodiment, presenting a subset of one or more videos in response to a video search query may include the searchable map 502 showing one or more locations corresponding to creation locations of one or more videos 204(1)-(n). The searchable map 502 may display the creation locations as icons 504(1)-(n). Each of the icons 504(1)-(n) may represent a location where one of the videos 204(1)-(n) was recorded. In some embodiments, each of the one or more locations where one or more videos 204(1)-(n) were recorded may include a location where the video began, ended, or the like. The searchable map 502 may obtain the location from metadata associated with the video.

In one embodiment, a user may search the map using a time or a range of times to search for videos recorded during the times indicated by the user. In one embodiment, the user may use the search interface 202 to search for videos by time. In one embodiment, the user may enter a time or a time range into the search interface 202, and in response, the searchable map 502 may display one or more videos recorded during the time or time range. In one embodiment, the searchable map 502 may display one or more videos with playback during the time specified by the playback position indicator 222 of the navigation interface 202.

For example, the searchable map 502 may display one or more icons 504(1)-(n) as the user slides the playback position indicator 222 where the one or more icons 504(1)-(n) represent one or more videos recorded during the time indicated by the playback time. In one embodiment, the searchable map 502 may cease to display one or more icons 504(1)-(*n*) as the user slides the playback position indicator 222 to a time where the one or more videos represented by the one or more icons 504(1)-(*n*) were no longer being recorded. In one embodiment, the searchable map 502 may include one or more icons 504(1)-(*n*) representing the locations where a video is being uploaded in real time.

Multiple videos may have been recorded in or around a single location. In one embodiment, the searchable map 502 may display one or more icons 504(1)-(*n*) as a cluster icon 506(1)-(*n*). The cluster icon 506(1)-(*n*) may display a portion of each icon 504 of the cluster so that the user can interact with the icon 504. In one embodiment, a cluster icon 506 may be represented on the searchable map 502 by an icon different than the icon for a single video (e.g., different than the icon 540). In response to a user interacting with one of the cluster icons 506(1)-(*n*), the searchable map 502 may display one or more icons 504(1)-(*n*) associated with one or more videos of that cluster.

In some embodiments, the searchable map 502 may display the one or more icons 504(1)-(*n*) in different sizes. The different sizes may indicate different information to a user. For example, in one embodiment, a larger icon 504(1) may indicate that the video represented by that icon 504(1) may be more relevant than the video represented by another icon 504(2) based on the user's search. In another embodiment, a larger icon 504(1) may indicate that the video represented by that icon 504(1) is more detailed than (e.g., longer or of higher quality) than the video represented by another icon 504(2).

In one embodiment, a user may select one or more icons 504(1)-(*n*) and the selection module 106 may select the one or more videos associated with the selected icons. The selection module 106 may send the selected videos to the playback module 108. In one embodiment, a graphical display, such as the graphical display 200, 500, or the like, or other software may process the inputted search data. Processing the inputted search data may include converting the search data into a search query. The search query may include a string of text in a certain format. The search query may be parseable into parameters by software/hardware of the server 114, the selection module 106, or the like. The graphical display 200, the playback module 108, another module, or other software/hardware may send the search query to the server 114, selection module 106, or the like.

Figure 6:
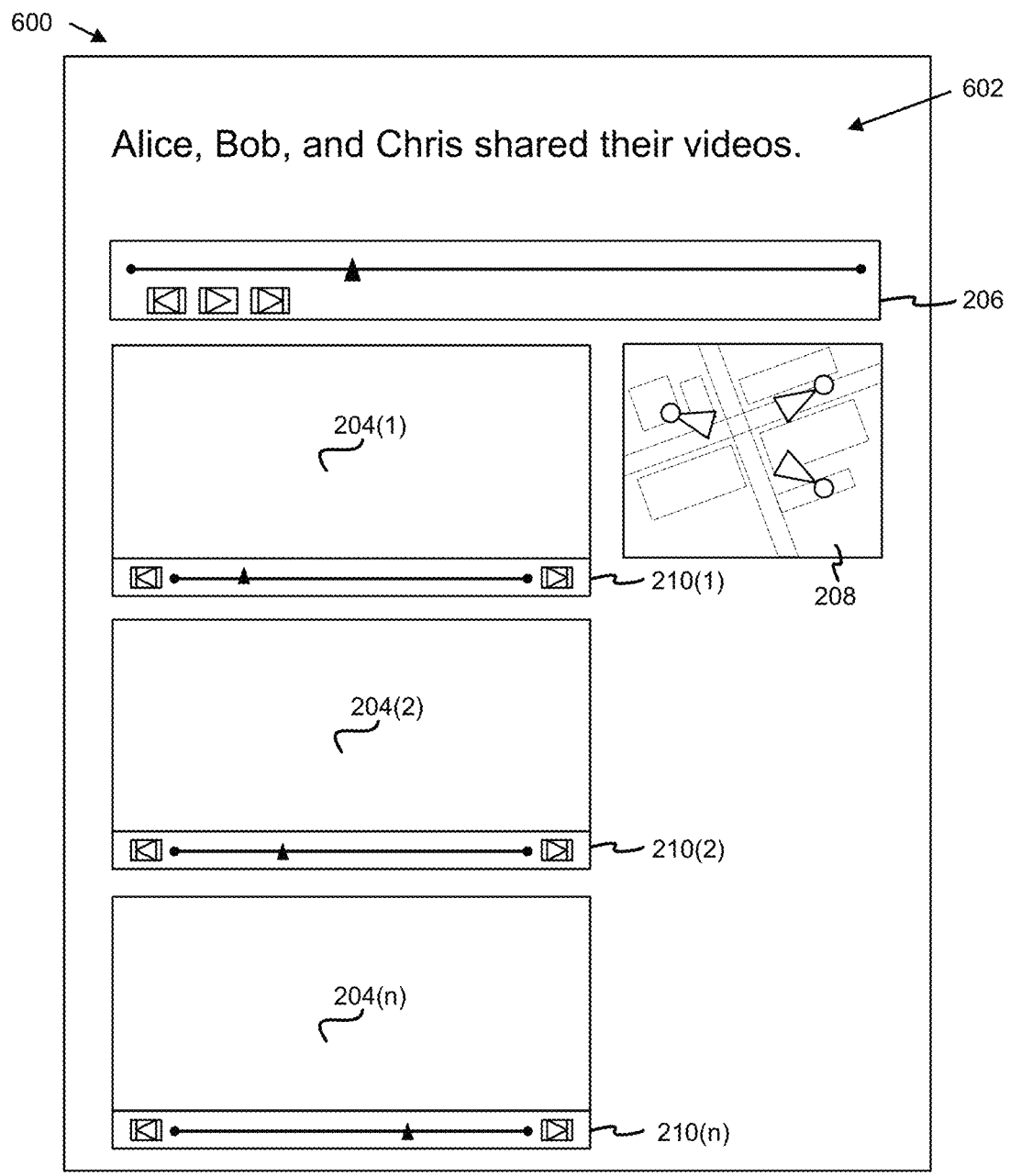
FIG. 6 is a diagram illustrating one embodiment of a social networking platform user interface for multiple independent video recording integration.

FIG. 6 depicts one embodiment of a graphical display 600. The graphical display 600 may include the playback navigation interface 206, the map 208, the one or more videos 204(1)-(*n*), and/or the one or more adjustment interfaces 210(1)-(*n*) as described above.

In one embodiment, the graphical display 600 may be provided via a social networking platform. In one embodiment, the graphical display 600 may include one or more social networking platform elements 602. In one embodiment, one or more modules of the system 100 may be integrated into a social networking platform. For example, multiple devices (e.g., multiple recording devices 110) may concurrently broadcast live video to a social networking platform, such as for presentation within the social networking platform. Some users of the multiple recording devices 110 may be linked as social network connections. Other users of the multiple recording devices 110 may not be linked as social network connections. Here the social networking platform may provide synchronized playback of the multiple live videos. The multiple live videos may be grouped together (e.g., selected by a section module 106 within the social networking platform) based on recording location, based on a level of connectedness within the social network (e.g., connections, connections of connections, belonging to a common group, etc.), by subscription level, by user preference/selection, and the like.

In one embodiment, a social networking platform may include a social network such as FACEBOOK, TWITTER, SNAPCHAT, or the like. The social networking platform may display one or more synchronized videos of one or more users of the social networking platform. In one embodiment, users of the social networking platform may upload the one or more videos to the social networking platform.

In one embodiment, the social networking platform may retrieve the one or more videos from the server 114. For example, a search interface as described above may be used to submit a search query. One or more videos 204(1)-(*n*) may be selected based on the search query and/or user selection. Synchronized video playback, as described above in FIGS. 2A-2D and 3A-3E, may then begin at the graphical display 600. For example, the one or more videos 204(1)-(*n*) may be integrated into a common timeline as illustrated in FIG. 3A. Additionally, video may be dynamically added and removed from the user interface (e.g., from the graphical display 600) as illustrated in FIGS. 3A-3B. In one embodiment, the one or more videos 204(1)-(*n*) may be presented in a vertical video stack, as illustrated in FIGS. 2B-2C. In another embodiment, the one or more videos 204(1)-(*n*) may be presented in a horizontal video stack or in a grid video stack, as illustrated in FIGS. 3B-3D.

A user of the social networking platform may view the one or more videos in response to the user being connected with one or more users of the social networking platform that uploaded the one or more videos. In one embodiment, the social networking platform may include a preexisting social networking platform. In one embodiment, the social networking platform may include a social networking platform designed, configured, or the like for the system 100 and/or the modules of the system 100. In one embodiment, the server 114 and/or database 116 may include at least a portion of the social networking platform.

In some embodiments, the social networking platform may include content created, posted, or the like by users of the social networking platform. For example, as depicted in FIG. 6, social networking platform content 602 may include text. The one or more videos 204(1)-(*n*) may appear near the social networking platform content 402. For example, the social networking platform content 602 may appear above, below, to the side of, the one or more videos 204(1)-(*n*) or the like.

In one embodiment, the selection module 106 may generate a hyperlink to an interface with the one or more videos such as the graphical display 200, as described above. In one embodiment, the hyperlink may be integrated into a social networking platform. For example, a user may post the hyperlink on a social networking platform. In one embodiment, the social networking platform content 602 may include the hyperlink. In one embodiment, in response to the hyperlink being integrated into the social networking platform, the social networking platform may display the hyperlink and allow users of the social networking platform to interact with the link.

For example, in one embodiment, a user may post a hyperlink to a video-watching interface (such as the graphical display 200, 500, or 600) on a social networking platform. The hyperlink may appear on a web page associated with the user of the social networking platform. The hyperlink may be visible to one or more users of the social networking platform, for example, to connections of the user that posted the hyperlink. In one embodiment, a user interacting with the hyperlink may include a user accessing the hyperlink and opening the video-watching interface, for example, in a browser.

In one embodiment, the video-watching interface may be embedded in a webpage of the social networking platform. In one embodiment, the user posting the hyperlink on the social networking platform may input data into the social networking platform to be associated with the hyperlink. For example, in one embodiment, the user may input text about the one or more videos and the text may be displayed with the hyperlink and/or the embedded video-watching interface. In one embodiment, for example, the user may input one or more tags and the tags may allow other users to search on the social networking platform for user posts containing those tags.

In one embodiment, the system 100 may include a video networking module. The video networking module may execute and/or be stored on the server 114 or another computing device. The video networking module may execute a video networking platform. The storage module 104, the server 114, and/or the database 116 may store data of the video networking platform. A user may access the video networking platform through a client device 118 and/or a recording device 110(1)-(*n*), for example, by using an Internet browser, an app, or other software.

In one embodiment, the video networking platform may include one or more user accounts. Two or more user accounts may be connected. Two or more user accounts being connected may include the two accounts designating each other as friends, contacts, or the like. In response to a user logging into his or her user account, the user may view his or her video networking homepage. A user account's video networking homepage may include videos uploaded by one or more user accounts connected to the user's account.

In one embodiment, a user's account video networking homepage may include videos uploaded by user accounts connected to user accounts that are connected to the user. For example, a first user account may be connected to a second user's account and a third user's account may be connected to the second user's account. In response to the third user uploading a video, the second user's account (a user account connected to the third user's account) networking homepage may include the third user's video and the first user's account (a user account connected to the second user's account) networking homepage may include the third user's video. The user's account's video networking homepage may include linked videos, as described below. The user's account's video networking homepage may include videos viewable to all users in the video networking platform.

In one embodiment, a user's account homepage may include one or more videos grouped and/or synchronized where the metadata associated with those videos includes specific metadata, for example, a certain description tag specified by the account's user. For example, in one embodiment, a user may configure the user's account's video networking homepage to automatically display and synchronize all videos where the metadata of the videos include a specific description tag.

In one embodiment, the video networking platform may include a graphical display. The graphical display may include a display similar or identical to the graphical display 200 of FIG. 2A or the graphical display 350 of FIGS. 3B-E. The graphical display may display one or more synchronized videos. The graphical display may dynamically present the one or more synchronized videos in response to a video containing a portion corresponding to the current playback time. The graphical display may dynamically remove one or more videos in response to a video not containing a portion corresponding to the current playback time. The graphical display may dynamically rearrange the one or more videos presented in the graphical display in response to the graphical display presenting or removing one or more videos. The dynamic presentation, arrangement, and removal of the one or more videos by the graphical display may be similar to that described above in relation to FIG. 2A and/or FIGS. 3B-E.

A user may play the one or more videos of the graphical display in response to at least one of the videos being accessible to the user account. A video may be accessible in response to the video being uploaded by a connected user, the video being linked to a video of the user, or the like as described above. In one embodiment, a user may add text data to the graphical display. For example, a user may add a description to the one or more synchronized videos where the user uploaded at least one of the synchronized videos or may add a comment to the one or more synchronized videos. In certain embodiments, the text data is associated with the synchronized videos as metadata.

In one embodiment, the system 100 may include a video linking module. The video linking module may determine that two or more videos recorded by two or more different users may be candidates for linking based at least in part on the metadata of the two or more videos. The video linking module may determine this in a variety of ways. In one embodiment, the video linking module may determine that the two or more videos were recorded in close geographic proximity to each other. The video linking module may determine that two or more videos were recorded in close geographic proximity to each other based at least in part on geo-location metadata of each video of the two or more videos.

In response to the video linking module determining that two or more videos were recorded in close geographic proximity to each other, the video linking module may send a linking request to the recording devices 110(1)-(*n*) of the users that recorded the two or more videos. The linking request may include a message asking each user permission to link to another users' one or more videos with the other users' one or more videos that were recorded in close proximity. In response to the users answering the request and giving permission, the video linking module may link the two or more videos. Linking the two or more videos may include adding metadata to each of the two or more videos. The metadata may include data about the linked videos such as a location of the videos on the server 114 or in the database 116.

In one embodiment, as described above, the selection module 106 may select a video based on the metadata of the video matching or being similar to one or more portions of a search query. In response to the selection module 106 selecting that video, the selection module 106 may select one or more videos linked the selected video. The selection module 106 may send the linked videos to the playback module 108 in addition to the selected video. The playback module 108 may indicate to a user that the one or more linked videos are linked to the selected video. In one embodiment, in response to the selection module 106 sending a video that matches a search query to the playback module 108, the selection module 106, the video linking module, or another module, may automatically send one or more videos that are linked to the video sent by the selection module 106 to the playback module 108.

In one embodiment, the social networking platform or a video networking platform, as described above, may include the video linking module. The social/video networking platform may execute the video linking module and may link, present, display, etc. the one or more videos associated with the social/video networking platform. In one embodiment, the one or more linked videos may not have been uploaded by user accounts that are connected on the social/video networking platform, as described above. In another embodiment, the users that uploaded the one or more linked videos may be connected. In one embodiment, the one or more linked videos may be linked on the social/video networking platform (for example, by referencing one another in metadata stored on the social/video networking platform), but the one or more linked videos may not be linked on the server 114 or the database 116.

It should be noted that this video linking, as described above, should not be confused with linking the recording devices 110(1)-(n) that recorded the one or more linked videos. The one or more recording devices 110(1)-(n) independently recorded the one or more videos linked together by the video linking module and the one or more recording devices 110(1)-(n) may not be associated with one another, as described above in relation to independent recording devices 110(1)-(n).

As described above, in one embodiment, the client device 118 may include a virtual reality headset such as virtual reality goggles. The playback module 108 may display one or more videos in the headset. The videos may include videos recorded by recording module 102 of the recording devices 110(1)-(n) and retrieved from the server 114 and/or database 116 as described above. In one embodiment, the headset may include multiple screens and the playback module 108 may display a different video for each screen. In another embodiment, the headset may include a single display and the playback module 108 may display a different video on different portions of the display. The playback module 108 may synchronize the different videos.

In one embodiment, the playback module 108 may display a composite three-dimensional image or video generated from one or more videos recorded simultaneously by the recording device 110(1)-(n) and retrieved from the server 114 and/or database 116. The playback module 108 or another module may generate the composite image or video by aggregating and/or processing the one or more recorded videos. A user may use the playback module 108 to rotate the image or video and view different angles of the image or video.

Figure 7:
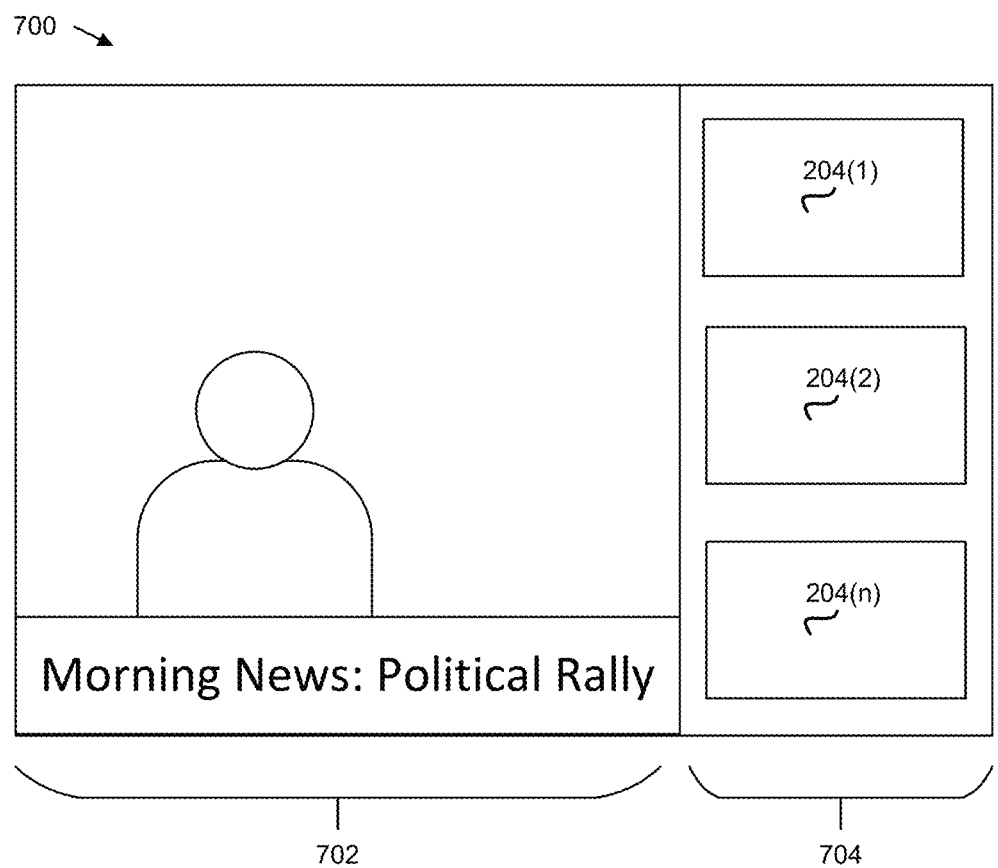
FIG. 7 is a diagram illustrating one embodiment of a graphical display for broadcasting multiple independent video recording integration.

FIG. 7 depicts a graphical display 700, according to embodiments of the disclosure. The graphical display 700 may include, in some embodiments, a user interface. For example, the graphical display 700 may be one embodiment of a media player used with synchronized playback of multiple independent videos. In one embodiment, the graphical display 700 may include a graphical display for television. For example, as depicted in FIG. 7, the graphical display 700 may include a display presented during a television show. In one embodiment, the graphical display may include television content 702. The television content 702 may include content recorded for a television show, podcast, video log, or the like.

In one embodiment, the graphical display 700 may include synchronized video content 704. The synchronized video content 704 may include one or more videos 204(1)-(n). The one or more videos may be synchronized with the television content 702. The one or more videos 204(1)-(n) may appear in an area for synchronized videos or may be integrated with the display of the television content 702. In one embodiment, the graphical display 700 may be broadcast to a television. In one embodiment, the graphical display 700 may be transmitted to a playing module 108 of a client device 118.

In certain embodiments, the graphical display 700 may be used to integrate the disclosed synchronized playback on third-party websites or on other communications media. As an example; video content is shown on a news network channel (e.g., broadcast as a television program) and the consolidated videos 204(1)-(n) also integrated into the website of the news network channel. In such embodiments, the media player providing the synchronized video content 704 may be integrated into the website and act as a portal to a back-bone database of video content, for example for viewing at the client device 118.

Figure 8:
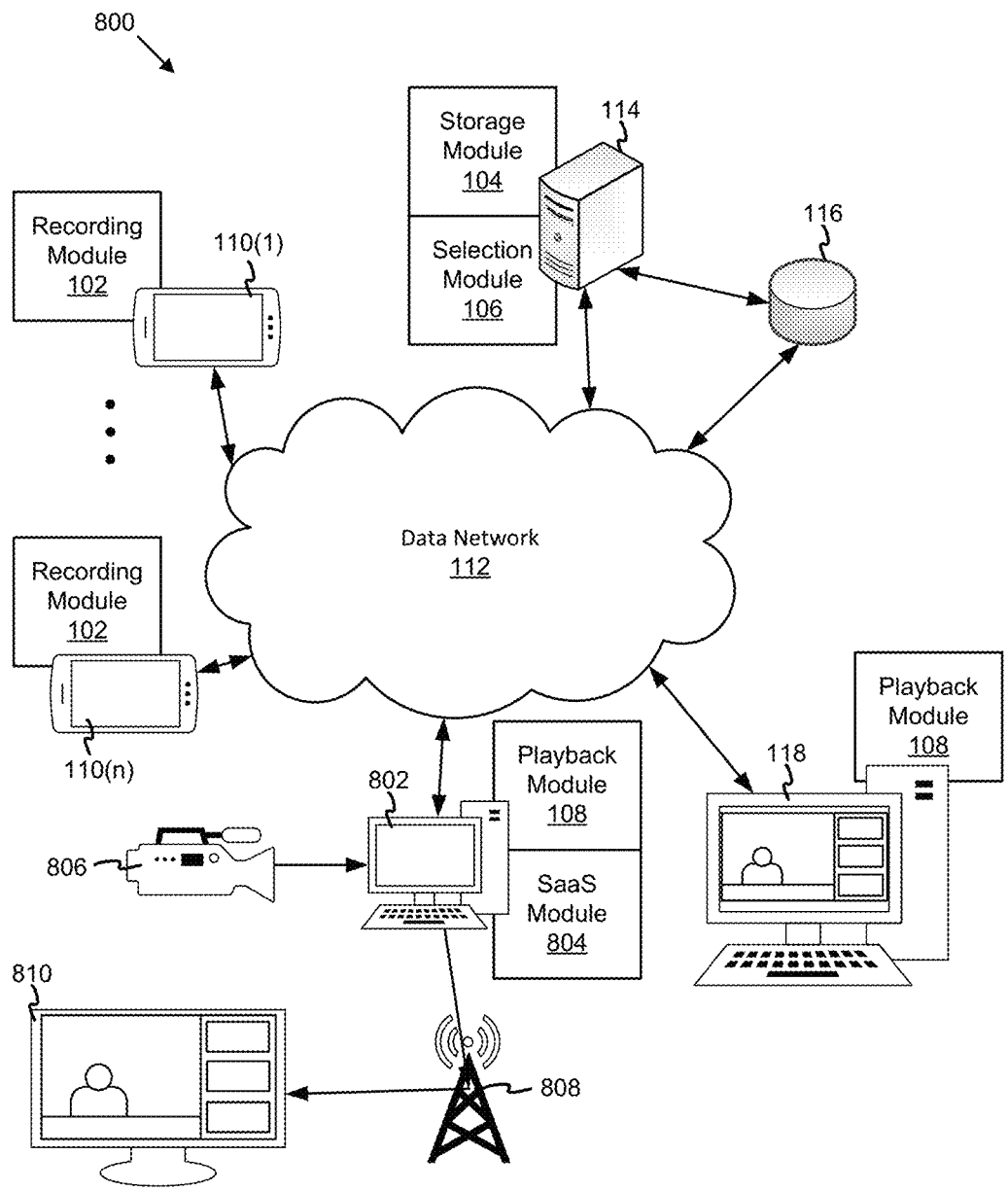
FIG. 8 is a schematic block diagram illustrating one embodiment of a system for multiple independent video recording integration.

FIG. 8 depicts one embodiment of a system 800. The system 800 may include the recording module 102, the storage module 104, the selection module 106, the playback module 108, the one or more recording devices 110(1)-(n), the data network 112, the server 114, and the database 116 as described above in relation to FIG. 1. In one embodiment, the system 800 may include a SaaS client device 802. The SaaS client device 802 may include one or more computers, servers, computer networks, electronic devices, or the like. The SaaS client device 802 may communicate with the server 114 and/or database 116 through the data network 112. The SaaS client device 802 may send and/or receive data over the data network 112.

In one embodiment, the system 800 may include a software-as-a-service module (SaaS module) 804. The SaaS module 804 may execute one or more operations on the SaaS client device 802 to send data to and/or receive data from the server 114 and/or database 116. The server 114 may send the SaaS module 804 one or more videos 204(1)-(n). The SaaS module 804 may synchronize the one or more videos 204(1)-(n). The SaaS module 804 may use the playback module 108 for various functionality as described above in relation to the playback module 108.

In certain embodiments, the SaaS module 804 provides a media player for viewing consolidated videos 204(1)-(n), as discussed above with reference to FIG. 7. Here, the SaaS module 804 may act as a portal for a website of the television program producer, allowing for playback of the synchronized video content 704 and/or synchronized playback of the one or more videos 204(1)-(n) over the internet.

In one embodiment, the system 800 may include one or more video cameras 806. The one or more video cameras 806 may record television content, such as the television content 602 described in relation to FIG. 7. The one or more video cameras 806 may transmit the recorded video to the SaaS client device 802. The SaaS client device 802 may synchronize the television content 702 with the synchronized video content 704, including the one or more videos 204(1)-(n).

In one embodiment, the system 800 may include a broadcasting system 808. The SaaS client device 802 may send the synchronized television content 702 and one or more videos 204(1)-(n) to the broadcasting system 808. The broadcasting system 808 may send the received content to one or more viewing devices 810. The broadcasting system 808 may include a radio or television antennae or tower, a satellite dish, a satellite, cables, or the like. The one or more viewing devices 810 may include televisions, computers, smartphones, smart TVs, or the like.

In one embodiment, the SaaS client device 802 may send the synchronized television content 702 and the synchronized video content 704 to a playing module 108 of a client device 118. The SaaS client device 802 may send that content via the data network 112. For example, the playback module 108 may include a plugin media player. The plugin media player may include a media player on a webpage, social networking platform, or the like. The plugin media player may receive the synchronized television content 702 and the synchronized video content 704. The plugin media player may synchronize the synchronized television content 702 and the synchronized video content 704. In response, a viewer may view the synchronized television content 702 and the synchronized video content 704 on the client device 118.

Although the SaaS module 804 has been described above in relation to news broadcasting, in some embodiments, an entity may use the SaaS module 804 for a purpose other than news broadcasting. For example, a social networking platform as described herein may use the SaaS module 804 to access the one or more videos 204(1)-(*n*) and synchronize them for users of the social networking platform, such as the client device 118. For example, the SaaS module 804 may provide a plug-in media player module for the synchronized video content 704 over a social networking platform, such as for viewing at the client device 118. Alternatively, the SaaS module 804 may provide a plug-in media player module for the synchronized video content 704 over an individual website.

Figure 9A:
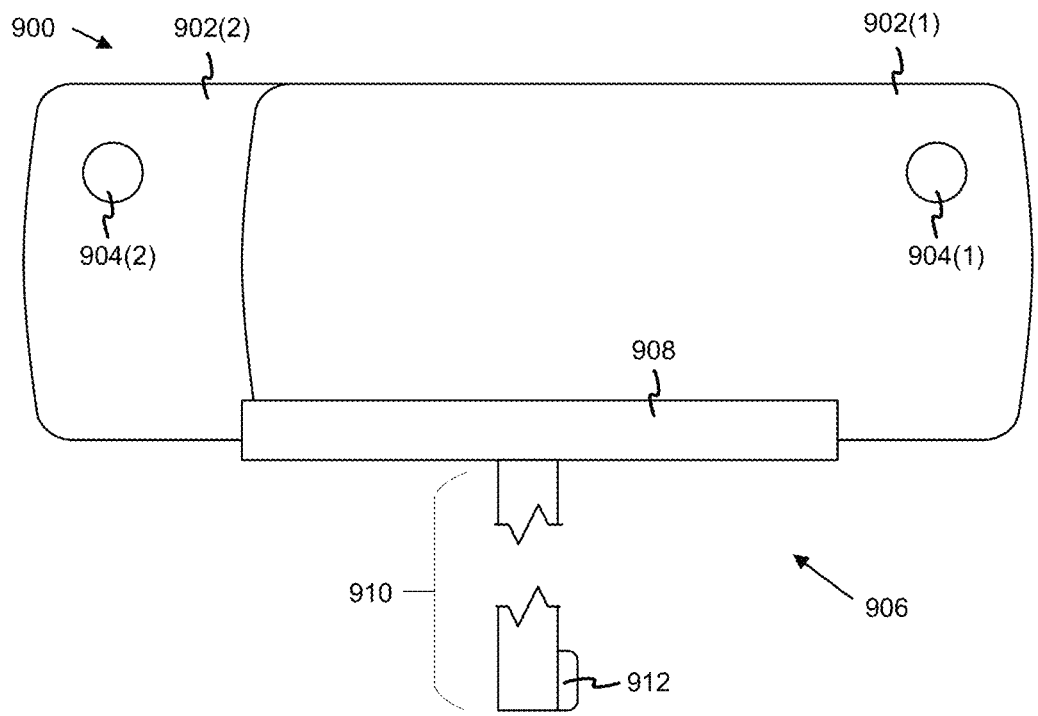
FIG. 9A is a front view diagram illustrating one embodiment of a system for recording three-dimensional videos for multiple independent video recording integration.
Figure 9B:
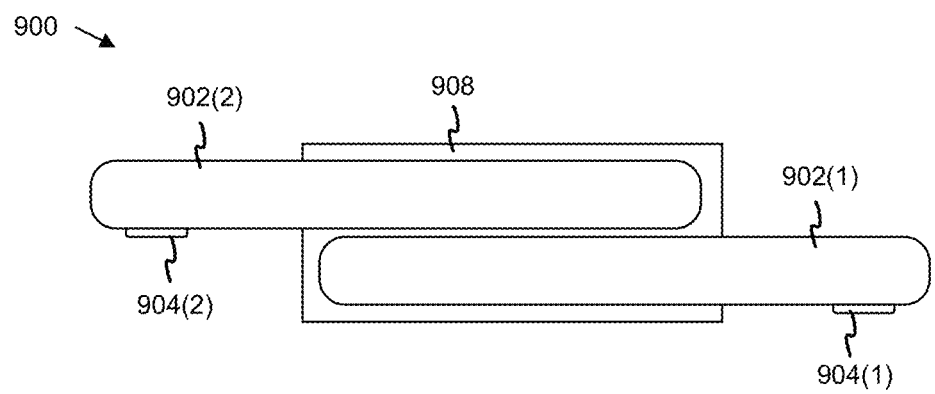
FIG. 9B is a top-down view diagram illustrating another embodiment of a system for recording three-dimensional videos for multiple independent video recording integration.

FIGS. 9A-B depict one embodiment of a system 900. The system 900 may include one or more recording devices 902(1)-(2). In one embodiment, the system 900 may include two recording devices 902(1)-(2). The one or more recording device 902(1)-(2) may include one or more recording devices 110(1)-(*n*) as described above. The one or more recording device 902(1)-(2) do not need to be identical devices, but may be a mix of different device types. The one or more recording device 902(1)-(2) may each include a lens 904(1)-(2) that may receive an image that the recording device 902(1)-(2) may record. As depicted in FIG. 9A, the one or more recording devices 902(1)-(2) may be arranged in the system 900 to face in the same direction.

In one embodiment, the system 900 may include a support apparatus 906. The support apparatus 906 may include a holding platform 908. The one or more recording devices 902(1)-(2) may be selectively disposed on the holding platform 908. The holding platform 908 may hold, grip, or the like, the one or more recording devices 902(1)-(*n*). The holding platform 908 may allow a user to adjust the positions the one or more recording devices 902(1)-(2) along the X, Y, or Z-axis.

In one embodiment, the support apparatus 906 may include a handle 910. The handle may include a handle of various lengths and/or widths. The handle 910 may be disposed on the support platform 908. The handle 910 may connect to the support platform 908. The handle 910 may include a button 912 disposed on the handle 910. The button 912 may connect to the one or more recording devices 902(1)-(2). In response to a user pushing the button 912, the one or more recording devices 902(1)-(2) may being or cease recording. In certain embodiments, each of the one or more recording devices 902(1)-(2) may access the server 114 using independent connections. The one or more recording devices 902(1)-(2) may include smart phones, tablets, 360 degree cameras, or any other recording device 110. The button 912 may connect to the one or more recording devices 902(1)-(2) physically (e.g. through a cable or the like) or through one or more signals (e.g. radiofrequency [RF], BLUETOOTH, or the like).

Figure 9C:
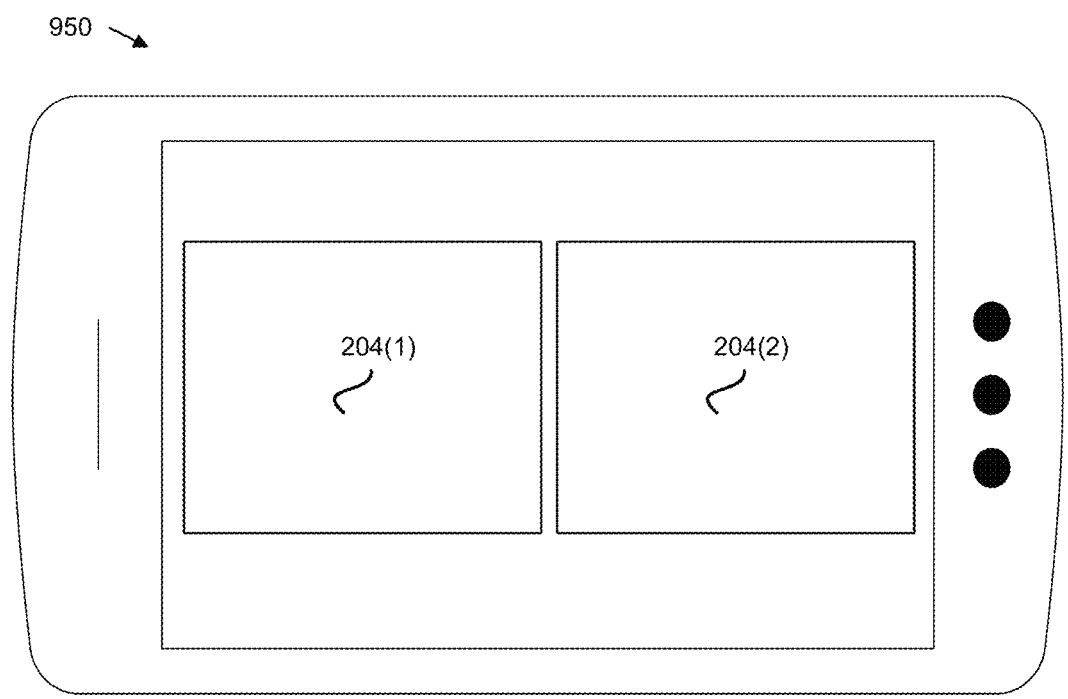
FIG. 9C is a front view diagram illustrating one embodiment of a mobile device displaying a graphical display for integrating multiple independent videos into a virtual reality configuration.

FIG. 9C depicts one embodiment of a playback device 950. In one embodiment, the playback device may include a smartphone, a virtual reality (VR) headset, or the like. The playback device 950 may include a graphical display that may include two videos 204(1)-(2). The two videos 204(1)-(2) may include videos recorded by the one or more recording devices 902(1)-(2) of FIGS. 5A-B. The two videos 204(1)-(2) may be displayed in adjacent locations in a user interface of the playback device 950. Displaying the adjacent videos 204(1)-(2) may position the first video 204(1) for viewing by a user's left side (e.g., the left eye) and the second video 204(2) may be positioned for viewing by the user's right side (e.g., the right eye). The positioning of the videos 204(1)-(2) on the user interface may allow a user to view the two videos 204(1)-(2) simultaneously such that they create a three-dimensional video. In certain embodiments, a divider may be located on the playback device 950 between the videos 204(1)-(2) such that each side (e.g., eye) only sees one of the videos 204(1)-(2).

In certain embodiments, two videos from two 360 degree cameras may be presented in synchronized playback, each camera corresponding to a right side or left side. When utilizing two 360 degree cameras, each video, the left and right side, would react in the VR player accordingly when the user moves their head left, right, up, down, etc. The two 360 degree cameras basically act as two all-seeing eyes. The selection module (or, alternatively, the playback module 108) integrates these two video sources, synchronized both time and directional viewing for each video file and links it to the left and right eye accordingly, and, using VR, the viewer can be totally immersed in a 3D field of view with the 360 degree video environment. In certain embodiments, the video environment may be limited to a 180 degree field of view. The support apparatus 906 may mount the two 360 degree cameras with the server 114 integrate everything else automatically for VR playback.

FIG. 10 depicts one embodiment of a graphical interface 1000. The graphical interface may include a user interface. The graphical interface 1000 may include content administration, control, or the like. In one embodiment, the SaaS module 804 may include the content administration. The content administration may include a content table 1001. The content table 1001 may organize data about the videos 204(1)-(*n*). The videos 204(1)-(*n*) may be under the control of the user of the SaaS module 804. In one embodiment, the user that uploaded a video may give permission, control, or the like to the user of the SaaS module 804 to control the videos 204(1)-(*n*) and/or various data associated with the video.

In one embodiment, the content table 1001 may include a thumbnail column 1002. The thumbnail column 1002 may include a thumbnail for each video 204(1)-(*n*) in the content table 1001. In one embodiment, the content table 1001 may include a public/private column 1004. The private/public column 1004 may include whether each video 204(1)-(*n*) is public or private. A public video may include a video that appears in search results to users of the playback module 108, a video networking platform, a social networking platform, or the like. A private video may include a video that does not appear in the search results or appears for a limited number of users. The limited users may be specified by the user of the content administration, the user that recorded the video, or the like.

In one embodiment, the content table 1001 may include a number of linked videos column 1006. The number of linked videos column 1006 may include the number of other videos that have been linked to each video 204(1)-(*n*). Two or more videos may be linked as described herein. In one embodiment, a user may interact with the number of the number of linked videos column 1006 for a video and, in response, the content table 1001 may include information about the linked videos.

In one embodiment, the content table 1001 may include a description column 1008. The description column 1008 may include a description for each video 204(1)-(*n*). A description may include text. The text may include text set by the user who recorded the video, the user of the content administration, or the like. The text may include the text that is displayed in response to video playback. In one embodiment, the content table 1001 may include a location column 1010. The location column 1010 may include a location where each video 204(1)-(*n*) was recorded. The location may include GPS coordinates, an address, or the like.

In one embodiment, the content table 1001 may include a reference time column 1012. The reference time column 1012 may include a reference time for each video 204(1)-(*n*). The reference time may include a timestamp or the like. The reference time may include a time used to determine synchronization with one or more videos. For example, the reference time may include a start time, and end time, or the like. In one embodiment, the content table 1001 may include a duration column 1014. The duration column 1014 may include a duration time for each video 204(1)-(*n*). In one embodiment, the content table 1001 may include an end time column in addition to or in place of the duration column. In one embodiment, the end time or duration may be calculated from other timing data associated with the video.

In one embodiment, the content table 1001 may include a user column 1016. The user column 1016 may include the user that recorded each video 204(1)-(*n*). In one embodiment, the user may include the producer, recorder, or the like of the video. In one embodiment, the content table 1001 may include a search tag column 1018. The search tag column 1018 may include one or more search tags for each video 204(1)-(*n*). A search tag may include text added by the user that recorded the video, the user of the content administration, or the like. The search tags may include text related to the content of the video that may cause the video to appear in search results in response to a user searching for video as described herein. In one embodiment, the content table 1001 may include a delete column 1020. The delete column 1020 may include a button for each video 204(1)-(*n*). In response to a user interacting with the delete button of a video, the video may be deleted. The video may be removed from the server 114, database 116, or the like.

Figure 11:
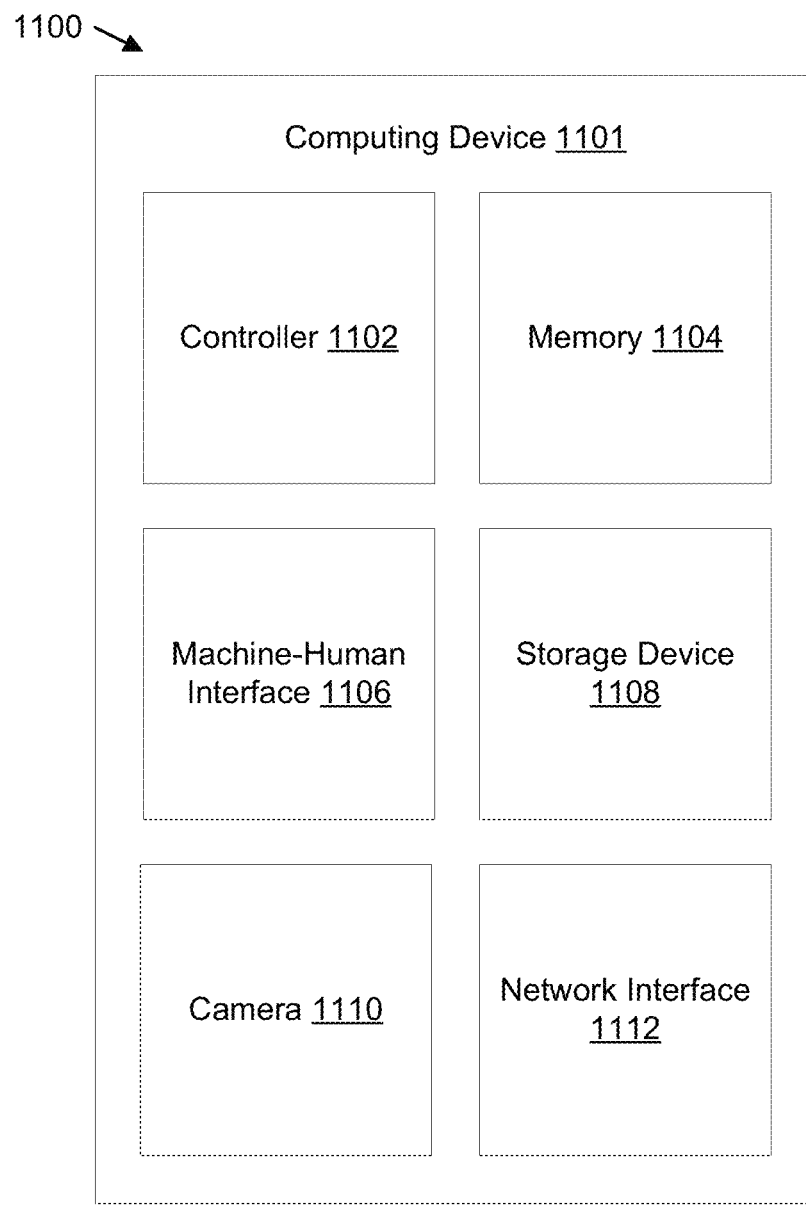
FIG. 11 is a schematic block diagram illustrating one embodiment of an apparatus that may be used for multiple independent video recording integration.

FIG. 11 depicts an apparatus 1100 that may be used for multiple independent video recording integration, according to embodiments of the disclosure. The apparatus 1100 may be an embodiment of the server 114 and/or the client device 118. The apparatus 1100 comprises a computing device 1101, such as a cell phone, smart phone, tablet computer, laptop computer, a desktop computer, a cloud server, a main frame computer, or any other type of computing device. Furthermore, the apparatus 1100 includes a controller 1102, a memory 1104, and a network interface 1112. Various implementation of the apparatus 110 may include a machine-human interface ("MHI") 1106, a storage device 1108, and/or a camera 1110.

The controller 1102, in one embodiment, may include any known controller capable of executing computer-readable instructions and/or capable of performing logical operations. For example, the controller 1102 may be a microcontroller, a microprocessor, a central processing unit ("CPU"), a graphics processing unit ("GPU"), an auxiliary processing unit, a field programmable gate array ("FPGA"), or similar programmable controller. In some embodiments, the controller 1102 executes instructions stored in the memory 1104 to perform the methods and routines described herein. The controller 1102 is communicatively coupled to the memory 1104, the MHI 1106, the storage device 1108, the camera 1110, and/or the network interface 1112.

In certain embodiments, the controller 1102 may receive a plurality of videos 204(1)-(*n*) from a plurality of recording devices 110(1)-(*n*) and metadata for the plurality of videos 204(1)-(*n*). Here, the metadata includes at least a reference time for each of the plurality of videos 204(1)-(*n*). The controller 1102 also selects for playback at least a first video 204(1) and a second video 204(2), wherein the first video 204(1) and the second video 204(2) were recorded on different recording devices 110 not directly networked together. The controller 1102 further synchronizes playback of the first video 204(1) and the second video 204(2) in a single user interface (e.g., the graphic display 200, 212, 350, or 600), wherein synchronizing playback the plurality of recorded video and audio comprises integrating the first video 204(1) and the second video 204(2) into a common timeline 300 based at least in part on the metadata of each of the first video 204(1) and the second video 204(2).

In certain embodiments, the controller 1102 receives a video search query from a user. In such embodiment, selecting for playback a first video 204(1) and a second video 204(2) may include presenting at least a subset of the plurality of videos 204(1)-(*n*) to a user, each video 204 in the having metadata matching a parameter of the video search query. Here, the parameter may be one or more of an event, a time range, a geo-location, and a producer the subset of the plurality of videos 204(1)-(*n*). The controller 1102 further receives user selection of the first video 204(1) and the second video 204(2), the first video 204(1) and the second video 204(2) being a part of the subset. In certain embodiments, the controller 1102 includes a video converter that converts each of the plurality of videos 204(1)-(*n*) into a common format.

In certain embodiments, the controller 1102 may dynamically add a third video that overlaps in time with one of the first video and the second video. The controller 1102 may also remove the second video from the user interface in response to the second video not overlapping in time with the first video. In certain embodiments, the controller 1102 presenting audio from the first video while muting audio from the second video.

In certain embodiments, the controller 1102 presenting the common timeline as a slider element in the user interface, wherein a user selects a playback position of the first video and the second video using the slider element. In one embodiment, the slider element visually indicates moments on the common timeline where the first video and the second video overlap in time and moments where the first video and the second video do not overlap in time.

In certain embodiments, the controller 1102 presenting at least a subset of the plurality of videos to a user, the subset including the first video and the second video and receiving user selection of the first video and the second video. In such embodiments, the controller 1102 presents at least a subset of the plurality of videos to a user occurs in response to the user providing a video search query. Here, the subset of the plurality of videos being search results corresponds to the video search query. In one embodiment, each video in the subset has metadata matching a parameter of the video search query. The parameter may be one or more of an event, a time range, a geo-location, and a producer.

In certain embodiments, the controller 1102 presents a map showing locations corresponding to creation locations of the search results. In one embodiment, the user selection includes a third video, wherein synchronizing playback of the first video and the second video further comprises the controller 1102 dynamically adding the third video to the playback of the first and second videos in response to content of the third video overlapping in time content of the first or second videos.

In certain embodiments, the controller 1102 compiles the first video and the second video into a single video using the common timeline. In some embodiments, the controller 1102 embeds playback of the first video and the second video into a third video. In one embodiment, the metadata further comprises timing metadata, wherein the controller 1102 aligns the first video and the second video based at least in part on the one or more timing metadata. In one embodiment, the metadata comprises user-defined metadata.

In some embodiments, the controller 1102 receives selection of an audio event in the first video and identifies a corresponding audio event in the second video. In such embodiments, the controller 1102 may integrate the first video and the second video into a common timeline based on the audio events. In certain embodiments, the controller 1102 receives selection of a visual event in the first video and identifies a corresponding visual event in the second video. Here, the controller 1102 integrates the first video and the second video into a common timeline based on the visual events. In one embodiment, the controller 1102 may adjust the playback of only the second video to synchronize with the first video.

In some embodiments, the controller 1102 presenting the first video and the second video in adjacent locations within the user interface. In one embodiment, the controller 1102 positions the first video 204(1) for viewing by a user's left eye and the second video 204(2) for viewing by the user's right eye.

The memory 1104, in one embodiment, is a computer readable storage medium. In some embodiments, the memory 1104 includes volatile computer storage media. For example, the memory 1104 may include a RAM, including dynamic RAM ("DRAM"), synchronous dynamic RAM ("SDRAM"), and/or static RAM ("SRAM"). In some embodiments, the memory 1104 includes non-volatile computer storage media. For example, the memory 1104 may include a hard disk drive, a flash memory, or any other suitable non-volatile computer storage device. In some embodiments, the memory 1104 includes both volatile and non-volatile computer storage media. In some embodiments, the memory 1104 also stores program code and related data, such as an operating system or other controller algorithms operating on the computing device 1101.

The MHI 1106, in one embodiment, facilitates human interaction with the electronic device 101 and includes input and/or output functions. For example, the MHI 1106 may include any known computer input device including a touch panel, a button, a keyboard, a stylus, a microphone, and the like. In one embodiment, the MHI 1106 may include a camera for capturing image data. In some embodiments, the MHI 1106 includes two or more different input devices, such as a touch panel and a button, dial, selector, etc.

The MHI 1106 may be designed to output visual, audible, and/or haptic signals. In some embodiments, the MHI 1106 includes an electronic display capable of outputting visual data to a user. For example, the MHI 1106 may include, but is not limited to, a liquid crystal display ("LCD") panel, a light emitting diode ("LED") display, an organic LED ("OLED") display, a projector, or similar display device capable of outputting images, text, or the like to a user. As another, non-limiting, example, the MHI 1106 may include a wearable display such as a smart watch, smart glasses, a heads-up display, or the like.

A display portion of the MHI 1106 may be integrated with an touch panel to form a touchscreen display. Further, the MHI 1106 may be a component of a smart phone, a personal digital assistant, a television, a table computer, a notebook (laptop) computer, a personal computer, or the like. In certain embodiments, the MHI 1106 includes one or more speakers for producing sound. For example, the MHI 1106 may produce an audible alert or notification (e.g., a beep or chime). In some embodiments, the MHI 1106 includes one or more haptic devices for producing vibrations, motion, or other haptic feedback.

In some embodiments, the apparatus 1100 includes a storage device 1108 that stores the received plurality of videos 204(1)-(n). In one embodiment, at least one of the first video 204(1) and the second video 204(2) is a live recording streamed from a recording device. In certain embodiments, the storage device 1108 stores the plurality of videos 204(1)-(n) in the common format as converted by the controller 1102.

The camera 1110 comprises electronic hardware for capturing video data. In certain embodiments, the camera 1110 also captures audio data corresponding to the video data. In one embodiment, the camera 1110 may include one embodiment of the recording module 102 described above. In another embodiment, the camera 1110 implements a portion embodiment of the recording module 102. The network interface 1112 is configured to communicate over the data network 112. The network interface 1112 may utilize wired and/or wireless links for communicating over the network 112.

Figure 12:
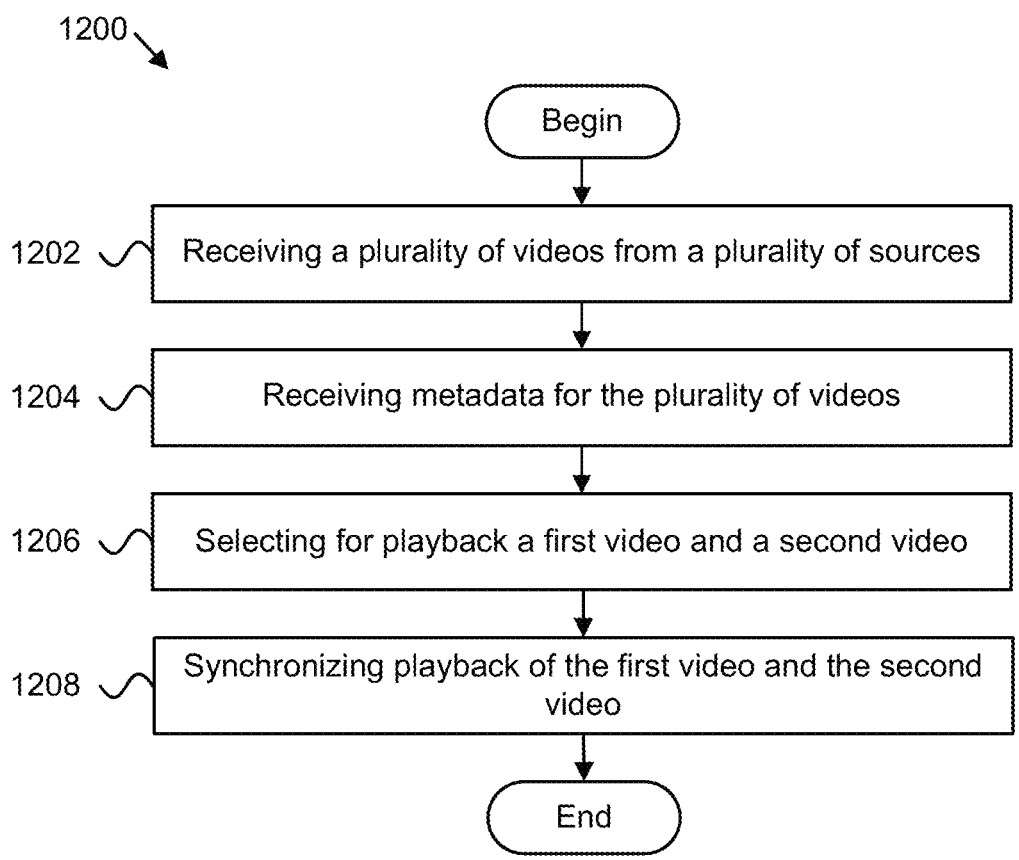
FIG. 12 is a flowchart diagram illustrating one embodiment of a method for multiple independent video recording integration.

FIG. 12 depicts one embodiment of a method 1200 for multiple video recording integration. In one embodiment, the method 1200 begins and may include receiving 1202 one or more videos from one or more sources. The one or more videos may include the videos 204(1)-(n). The one or more sources may include the recording device 110(1)-(n). In one embodiment, the storage module 104, the server 114, the database 116, or the like may receive the one or more videos.

In one embodiment, the method 1200 may include receiving 1204 metadata for the one or more videos. The metadata may include a reference time for each of the one or more videos. In one embodiment, the storage module 104, the server 114, the database 116, or the like may receive the metadata. In some embodiments, the user may create, set, the data, or the like. The metadata may include reference time for the recording, a geo-location of recording, a direction of recording, or the like as described above.

In one embodiment, the method 1200 may include selecting 1206 for playback a first video and a second video. The first video may have been recorded on different devices. The different devices may not be directly networked together. In one embodiment, the first and second video may include videos from the one or more videos 204(1)-(n). In one embodiment, the selection module 106 may select for playback the first and second videos as described above.

In one embodiment, the method 1200 may include synchronizing 1208 playback of the first video and the second video in a single user interface. Synchronizing playback of the one or more video and audio may include integrating the first video and the second video into a common timeline based on at least in part on the metadata of each of the first video and second video. In one embodiment, the playback module 108 may include the user interface. The selection module 106, playback module 108, or the like may synchronize the video and/or audio. In one embodiment, the playback module 108 may synchronize playback of the one or more videos as described above.

Figure 13:
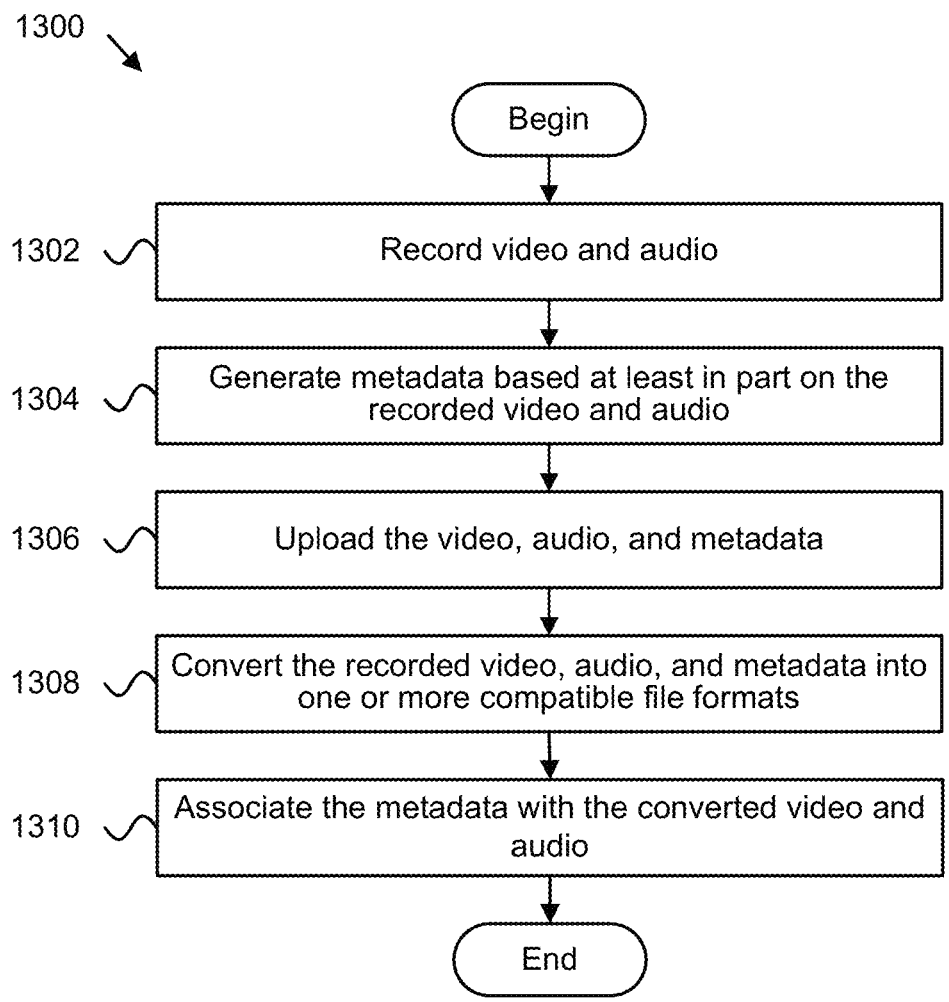
FIG. 13 is a flowchart diagram illustrating one embodiment of uploading video to be used in multiple independent video recording integration.

FIG. 13 depicts one embodiment of a method 1300 for multiple independent video recording integration. In one embodiment, the method 1300 beings and may include recording 1302 video and audio. In one embodiment, a recording device 110(1)-(n) may record video and audio. The method 1300 may include generating 1304 metadata based, at least in part, on the recorded video and audio. In one embodiment, the recording device may generate the metadata. In some embodiments, a user of the recording device 110(1)-(n) may generate the metadata.

The method 1300 may include uploading 1306 the converted video and metadata. In one embodiment, the recording device 110(1)-(n), recording module 104, or the like may upload the converted video and metadata. In some embodiments, uploading 1306 the converted video and metadata may include uploading to the server 114, database 116, or the like as described above. The method 1300 may include converting 1308 the recorded video and metadata into one or more compatible file formats. The recording module 102, storage module 104, selection module 106, playback module 108, server 114, database 116, or the like may convert the video and metadata as described above. In certain embodiments, the file formats may be compatible with the playback module 108, the client device 118, one or more recording devices 110(1)-(n), or the like. The method 1300 may include associating 1310 the metadata with the converted video and audio and the method 1300 ends. In one embodiment, the selection module 106, server 114, database 116, or the like may associate the metadata with the converted video and audio.

Figure 14:
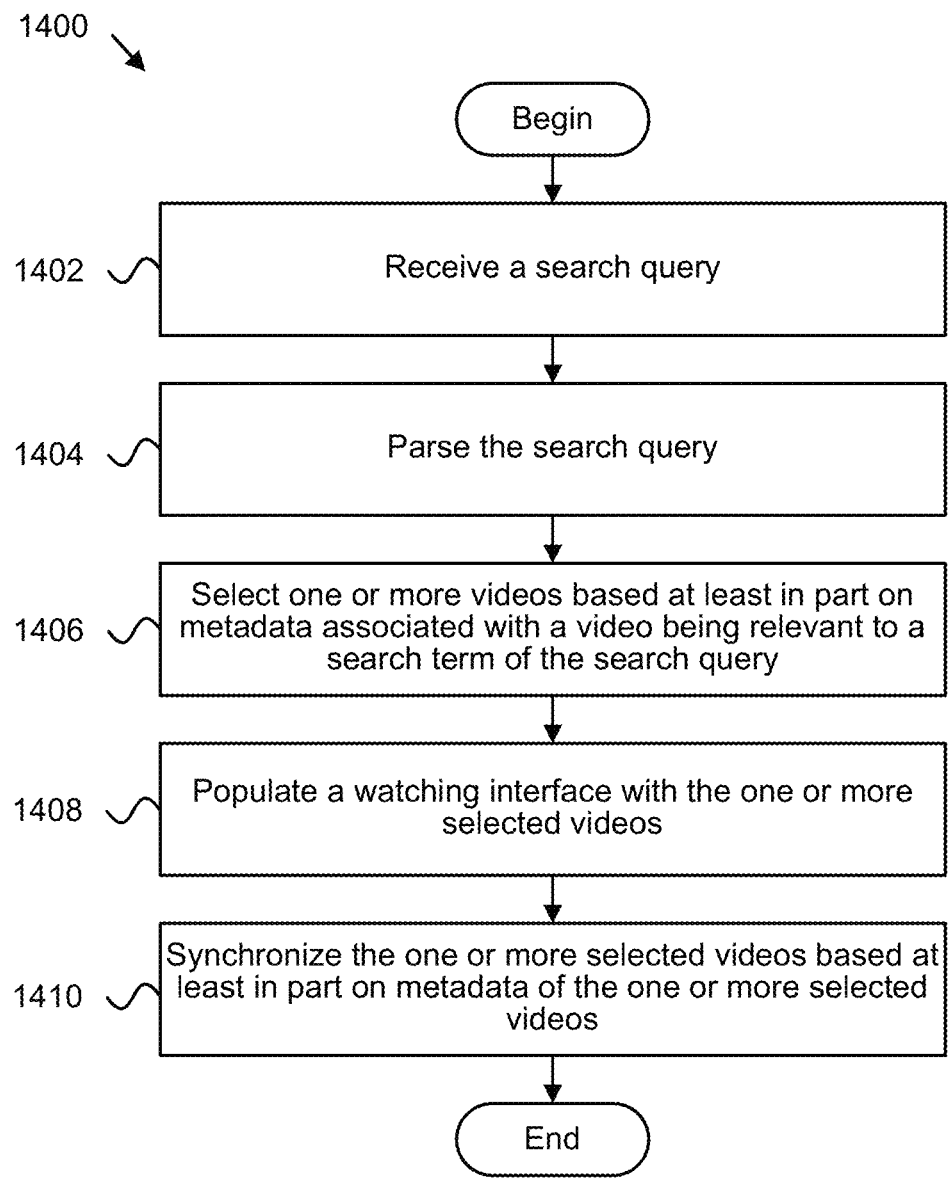
FIG. 14 is a flowchart diagram illustrating one embodiment of a method for processing a search query for use with multiple independent video recording integration.

FIG. 14 depicts one embodiment of a method 1400 for multiple independent video recording integration. In one embodiment, the method 1400 begins and may include receiving 1402 a search query. The search query may include a search query as described above. The method 1400 may include parsing 1404 the search query. In one embodiment, the selection module 104 may parse the search query as described above. The method 1400 may include selecting 1406 one or more videos based at least in part on metadata associated with a video being relevant to a search term of the search query. The method 1400 may include populating 1408 a video-watching interface (such as the graphical display 200) with the one or more selected videos. The method 1400 may include synchronizing 710 the one or more selected videos based at least in part on metadata of the one or more selected videos and the method 1400 ends.

Figure 15:
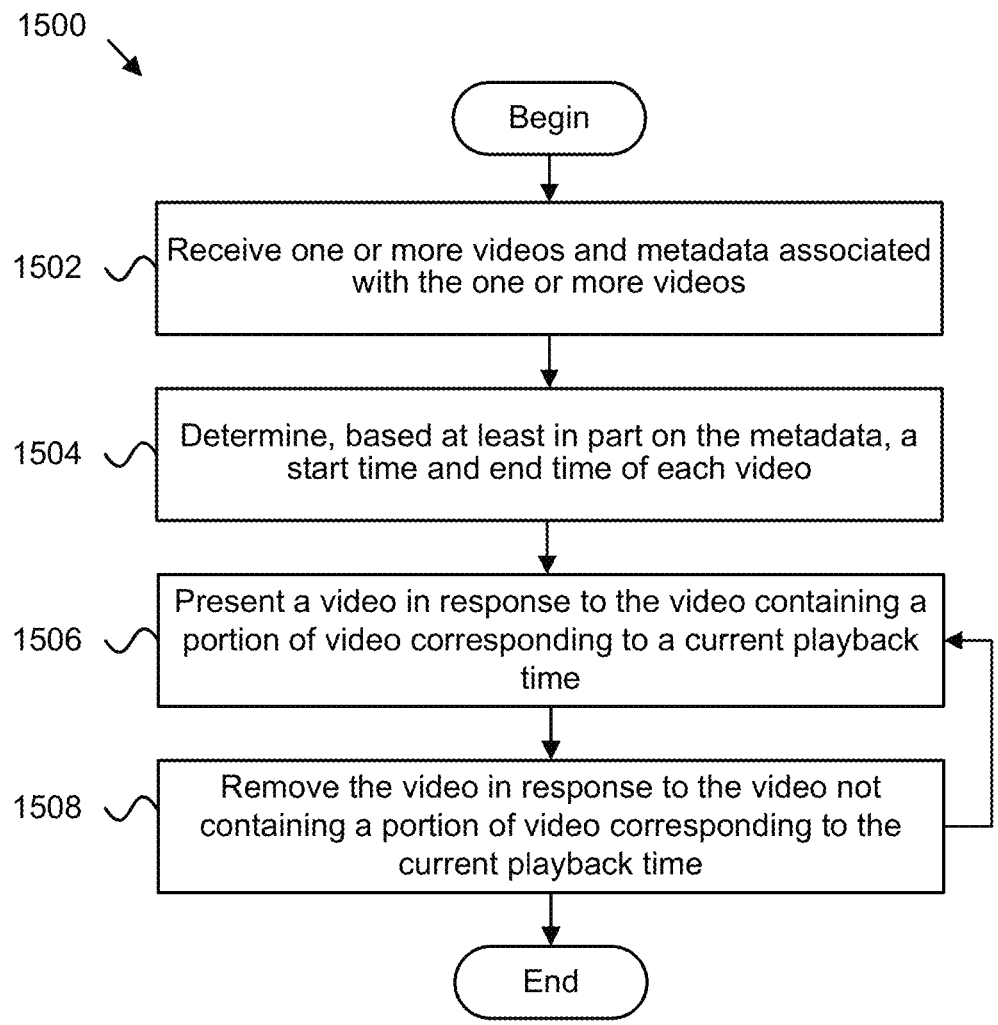
FIG. 15 is a flowchart diagram illustrating a further embodiment of a method for multiple independent video recording integration.

FIG. 15 depicts one embodiment of a method 1500 for multiple independent video recording integration. In one embodiment, the method 1500 begins and may include receiving 1502 one or more videos and metadata associated with the one or more videos. The method 1500 may include determining 1504, based at least in part on the metadata, a start time and end time of each video. The method 1500 may include presenting 1506 a video in response to the video containing a portion of video corresponding to a current playback time. The method 1500 may include removing 1508 the video in response to the video not containing a portion of video corresponding to the current playback time. The method 1500 may include repeating displaying 1506 and ceasing to display 1508 a video in response to the video either containing or not containing a portion of video corresponding to a current playback time.

Figure 16:
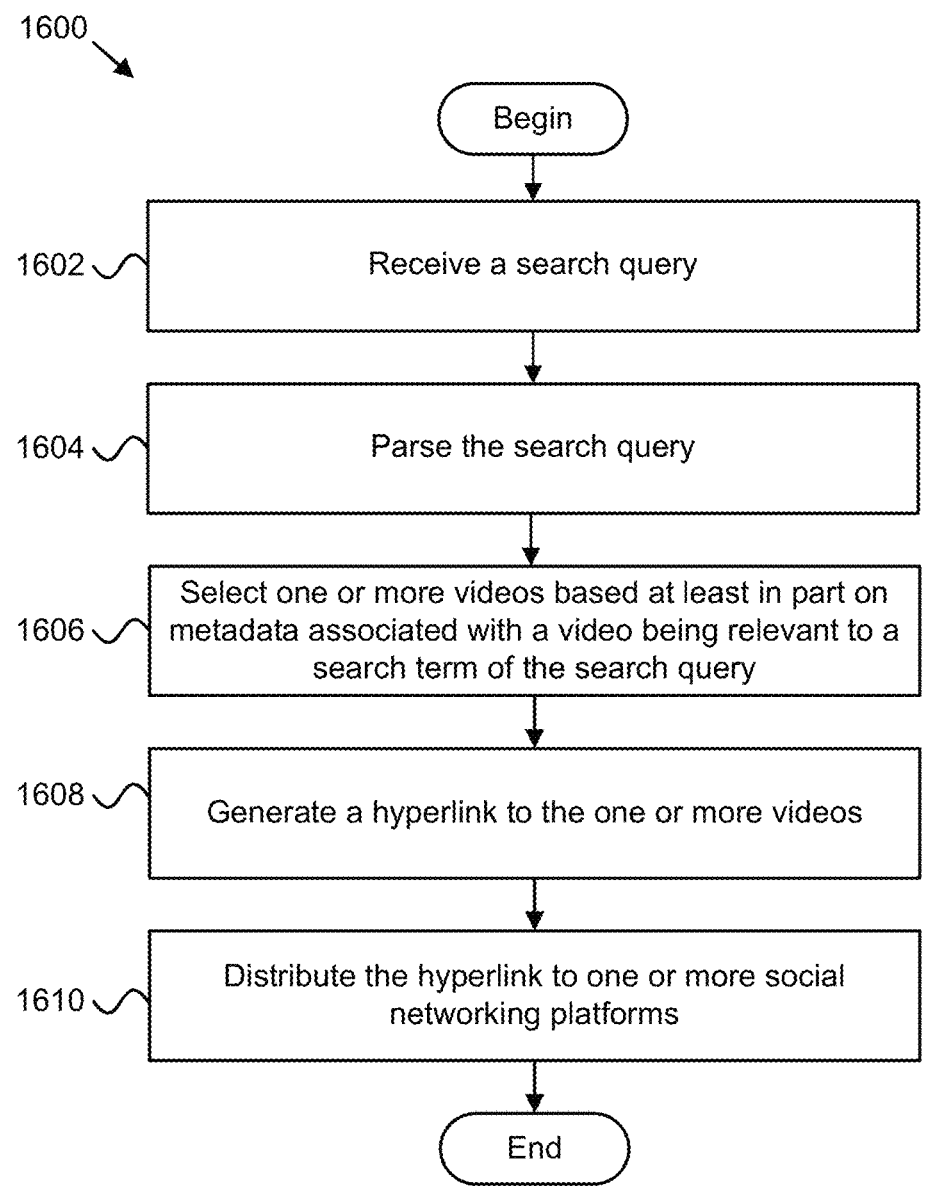
FIG. 16 is a flowchart diagram illustrating another embodiment of a method for processing a search query for use with multiple independent video recording integration.

FIG. 16 depicts one embodiment of a method 1600 for multiple independent video recording integration. In one embodiment, the method 1600 begins and may include receiving 1602 a search query. In one embodiment, the search query may include one or more description tags. The method 1600 may include parsing 1604 the search query. The method 1600 may include selecting 1606 one or more videos based at least in part on metadata associated with a video being relevant to a search term of the search query. In one embodiment, the selection module 106 may select 1606 one or more videos based at least in party on description tag metadata of the one or more videos matching or being similar to a description tag of a search term of the search query. The method 1600 may include generating 1608 a hyperlink to the one or more videos. The method 1600 may include distributing 1610 the hyperlink to one or more social networking platforms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for integrating multiple independent video recordings comprising:

receiving a plurality of videos from a plurality of sources;

receiving metadata for the plurality of videos, the metadata comprising a reference time for each of the plurality of videos;

selecting for playback a first video and a second video that at least partially overlap in time, wherein the first video and the second video were recorded on different devices not directly networked together;

identifying start times and stop times for the first video and second video;

integrating the first video and the second video into a common timeline based at least in part on the metadata of each of the first video and the second video, wherein the common timeline includes an overlap time during which both the first video and second video have content; and concurrently playing the first video and the second video in a single user interface, wherein concurrently playing the first video and the second video comprises:

playing both the first video and the second video in separate frames within the single user interface, and synchronizing playback of the first video and the second video according to the common timeline, wherein the first and second video are concurrently displayed within the single user interface during the overlap time;

wherein playing both the first video and the second video in separate frames within the single user interface comprises:

adding a first video frame to the single user interface when a start time of the first video is reached;

adding a second video frame to the single user interface when a start time of the second video is reached;

removing the first video frame from the single user interface when a stop time of the first video is reached; and removing the second video frame from the single user interface when a stop time of the second video is reached.

2. The method of claim 1, wherein concurrently playing the first video and the second video in a single user interface further comprises presenting the first video and the second video in adjacent locations within the user interface.

3. The method of claim 1, further comprising presenting the common timeline as a slider element in the single user interface, wherein a user selects a playback position of the first video and the second video using the slider element.

4. The method of claim 3, wherein the slider element visually indicates moments on the common timeline where the first video and the second video overlap in time and moments where the first video and the second video do not overlap in time.

5. The method of claim 1, wherein selecting for playback a first video and a second video comprises:
presenting at least a subset of the plurality of videos to a user, the subset including the first video and the second video; and
receiving user selection of the first video and the second video.

6. The method of claim 1, wherein the metadata further comprises timing metadata, wherein synchronizing playback of the first video and the second video comprises aligning the first video and the second video based at least in part on the one or more timing metadata.

7. The method of claim 1, wherein synchronizing playback of the first video and the second video further comprises adjusting the playback of only the second video to synchronize with the first video.

8. The method of claim 2, further comprising dynamically adding at least a third video that overlaps in time with one of the first video and the second video.

9. The method of claim 2, wherein concurrently playing the first video and the second video in a single user interface further comprises presenting audio from the first video while muting audio from the second video.

10. The method of claim 2, wherein the first video is positioned for viewing by a user's left side and the second video is positioned for viewing by the user's right side.

11. The method of claim 5, wherein the presenting at least a subset of the plurality of videos to a user occurs in response to the user providing a video search query, the subset of the plurality of videos being search results corresponding to the video search query.

12. The method of claim 1, wherein the single user interface is provided via a social networking platform, wherein concurrently playing the first video and the second video in a single user interface comprises presenting the first video and the second video over a user interface of the social networking platform.

13. The method of claim 11, wherein each video in the subset has metadata matching a parameter of the video search query, the parameter comprising one or more of an event, a time range, a geo-location, and a producer.

14. The method of claim 11, wherein presenting at least a subset of the plurality of videos to a user occurs in response to the user providing a video search query comprises presenting a map, the map showing locations corresponding to creation locations of the search results.

15. An apparatus for integrating multiple independent video recordings comprising:
a network interface;
a controller that:
receives, via the network interface, a plurality of videos from a plurality of recording devices;
receives, via the network interface, metadata for the plurality of videos, the metadata comprising a reference time for each of the plurality of videos;
selects for playback a first video and a second video that at least partially overlap in time, wherein the first video and the second video were recorded on different recording devices not directly networked together;
identifies start times and stop times for the first video and second video;
integrates the first video and the second video into a common timeline based at least in part on the metadata of each of the first video and the second video, wherein the common timeline includes an overlap time during which both the first video and second video have content; and
concurrently plays the first video and the second video in a single user interface, wherein concurrently playing the first video and the second video comprises:
playing both the first video and the second video in separate frames within the single user interface and synchronizing playback of the first video and the second video according to the common timeline, wherein the first and second video are concurrently displayed within the single user interface during the overlap time;
wherein playing both the first video and the second video in separate frames within the single user interface comprises:
adding a first video frame to the single user interface when a start time of the first video is reached;
adding a second video frame to the single user interface when a start time of the second video is reached;
removing the first video frame from the single user interface when a stop time of the first video is reached; and
removing the second video frame from the single user interface when a stop time of the second video is reached.

16. The apparatus of claim 15, further comprising:
a storage device that stores the received plurality of videos, wherein at least one of the first video and the second video is a live recording streamed from a recording device.

17. The apparatus of claim 16, further comprising:
a video converter that converts each of the plurality of videos into a common format, wherein the storage device stores the plurality of videos in the common format.

18. The apparatus of claim 16, wherein the controller further receives a video search query from a user, wherein selecting for playback a first video and a second video comprises:
presenting at least a subset of the plurality of videos to a user, each video in the having metadata matching a parameter of the video search query, the parameter comprising one or more of an event, a time range, a geo-location, and a producer the subset of the plurality of videos; and
receiving user selection of the first video and the second video, wherein the subset includes the first video and the second video.

19. A program product comprising a non-transitory computer readable medium that stores code executable by a processor, the executable code comprising code to perform:

receiving a plurality of videos from a plurality of independent sources;

receiving metadata for the plurality of videos, the metadata comprising a reference time for each of the plurality of videos;

selecting for playback a first video and a second video that at least partially overlap in time, wherein the first video and the second video were recorded on different devices not directly networked together;

identifying start times and stop times for the first video and second video;

integrating the first video and the second video into a common timeline based at least in part on the metadata of each of the first video and the second video, wherein the common timeline includes an overlap time during which both the first video and second video have content; and concurrently playing the first video and the second video in a single user interface, wherein concurrently playing the first video and the second video comprises:

playing both the first video and the second video in separate frames within the single user interface and synchronizing playback of the first video and the second video according to the common timeline, wherein the first and second video are concurrently displayed within the single user interface during the overlap time;

wherein playing both the first video and the second video in separate frames within the single user interface comprises:

adding a first video frame to the single user interface when a start time of the first video is reached;

adding a second video frame to the single user interface when a start time of the second video is reached;

removing the first video frame from the single user interface when a stop time of the first video is reached; and removing the second video frame from the single user interface when a stop time of the second video is reached.

* * * * *